United States Patent
Hauser et al.

(10) Patent No.: US 12,433,288 B2
(45) Date of Patent: Oct. 7, 2025

(54) SYSTEMS, DEVICES, AND/OR METHODS FOR MANAGING PEST CONTROL

(71) Applicants: Glenn W Willoughby, Richmond, VA (US); Matt Wallace, Monroe, NC (US); Jim Jernigan, Henrico, VA (US); Rodger Thomason, Santa Monica, CA (US); Paul Maguire, Goochland, VA (US); Laurie Weddington, Pebble Beach, CA (US)

(72) Inventors: Stephen G Hauser, Tarzana, CA (US); Glenn W Willoughby, Richmond, VA (US); Matt Wallace, Monroe, NC (US); Jim Jernigan, Henrico, VA (US); Rodger Thomason, Santa Monica, CA (US); Paul Maguire, Goochland, VA (US)

(*) Notice: Subject to any disclaimer, the term of this patent is extended or adjusted under 35 U.S.C. 154(b) by 0 days.

(21) Appl. No.: 18/121,758

(22) Filed: Mar. 15, 2023

(65) Prior Publication Data

US 2023/0276785 A1     Sep. 7, 2023

Related U.S. Application Data

(60) Provisional application No. 63/372,284, filed on Mar. 2, 2022.

(51) Int. Cl.
*A01M 29/12* (2011.01)

(52) U.S. Cl.
CPC .................. *A01M 29/12* (2013.01)

(58) Field of Classification Search
CPC .... A01M 1/20; A01M 1/2005; A01M 1/2011; A01M 1/2016; A01M 1/2022; A01M 1/2027; A01M 1/2044; A01M 1/2055; A01M 29/00; A01M 29/12; A61L 9/037; A61L 9/127
USPC ........... 239/51.5, 34–60; 43/129, 131, 132.1, 43/125, 124, 107; 422/123; 141/18, 31; 403/345, 335
See application file for complete search history.

(56) References Cited

U.S. PATENT DOCUMENTS

| | | | | |
|---|---|---|---|---|
| 2,632,280 | A * | 3/1953 | Heim ................... | A01M 1/2044 43/107 |
| 2,757,957 | A * | 8/1956 | Samann ................ | B65D 75/12 206/0.5 |
| 4,732,321 | A * | 3/1988 | Dolan .................. | A61L 9/12 239/45 |
| 4,739,928 | A * | 4/1988 | O'Neil .................. | A61L 9/127 239/45 |
| 5,038,394 | A * | 8/1991 | Hasegawa ........... | A01M 1/2077 392/395 |
| 5,094,025 | A * | 3/1992 | Daniels ............... | A01M 31/008 D22/125 |

(Continued)

*Primary Examiner* — Zoe Tam Tran
(74) *Attorney, Agent, or Firm* — Dawn-Marie Bey; Bey & Cotropia PLLC

(57) ABSTRACT

Certain exemplary embodiments can provide a system comprising a tub, a cover, a wick, and a diffuser cap. The tub defines a cavity. The tub is constructed to hold a liquid in the cavity. The tub comprises a top ring. The cover is constructed to be coupled to the top ring of the tub. The cover defines an aperture. The wick is constructed to convey a liquid via diffusion. The diffuser cap comprises a central stem. The central stem is constructed to engage with the wick. The diffuser cap is constructed to vent vapor conveyed to the diffuser cap via the wick.

10 Claims, 28 Drawing Sheets

(56) References Cited

U.S. PATENT DOCUMENTS

| | | | | |
|---|---|---|---|---|
| 5,095,647 | A * | 3/1992 | Zobele | A01M 1/2077 239/59 |
| 6,223,465 | B1 * | 5/2001 | Soller | A01M 1/2005 43/132.1 |
| 6,361,752 | B1 * | 3/2002 | Demarest | A01M 1/2072 422/306 |
| 6,553,712 | B1 * | 4/2003 | Majerowski | A01M 1/2044 43/132.1 |
| 6,603,924 | B2 * | 8/2003 | Brown | A01M 1/2077 219/541 |
| 7,281,670 | B2 * | 10/2007 | Lakatos | A01M 1/2077 122/366 |
| 7,325,358 | B1 * | 2/2008 | Chalupsky | A01M 29/12 239/57 |
| 7,360,671 | B2 * | 4/2008 | Slade | B67D 3/00 239/34 |
| 7,622,134 | B2 * | 11/2009 | Davis | A61L 9/127 424/DIG. 10 |
| 7,950,595 | B2 * | 5/2011 | Feriani | B05B 17/0607 239/45 |
| 12,151,053 | B2 * | 11/2024 | Pieper | A61M 21/00 |
| 2006/0175425 | A1 * | 8/2006 | McGee | A61L 9/127 239/44 |
| 2008/0093475 | A1 * | 4/2008 | Belongia | A01M 1/2044 239/44 |
| 2008/0276523 | A1 * | 11/2008 | McKechnie | A01M 1/2044 43/129 |
| 2011/0139892 | A1 * | 6/2011 | Gasper | A61L 9/037 29/428 |
| 2016/0193377 | A1 * | 7/2016 | Lagace | A61L 9/127 239/44 |
| 2016/0264290 | A1 * | 9/2016 | Hafer | A01M 1/2044 |
| 2021/0069370 | A1 * | 3/2021 | Camarero Díez | A61L 9/127 |

* cited by examiner

4000

5000

6000

7000

8000

10000

11000

12000

13000

21000

25000

25000

25000

SYSTEMS, DEVICES, AND/OR METHODS FOR MANAGING PEST CONTROL

CROSS-REFERENCES TO RELATED APPLICATIONS

This application claims priority to, and incorporates by reference herein in its entirety, U.S. Provisional Patent Application Ser. No. 63/372,284, filed Mar. 2, 2022.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
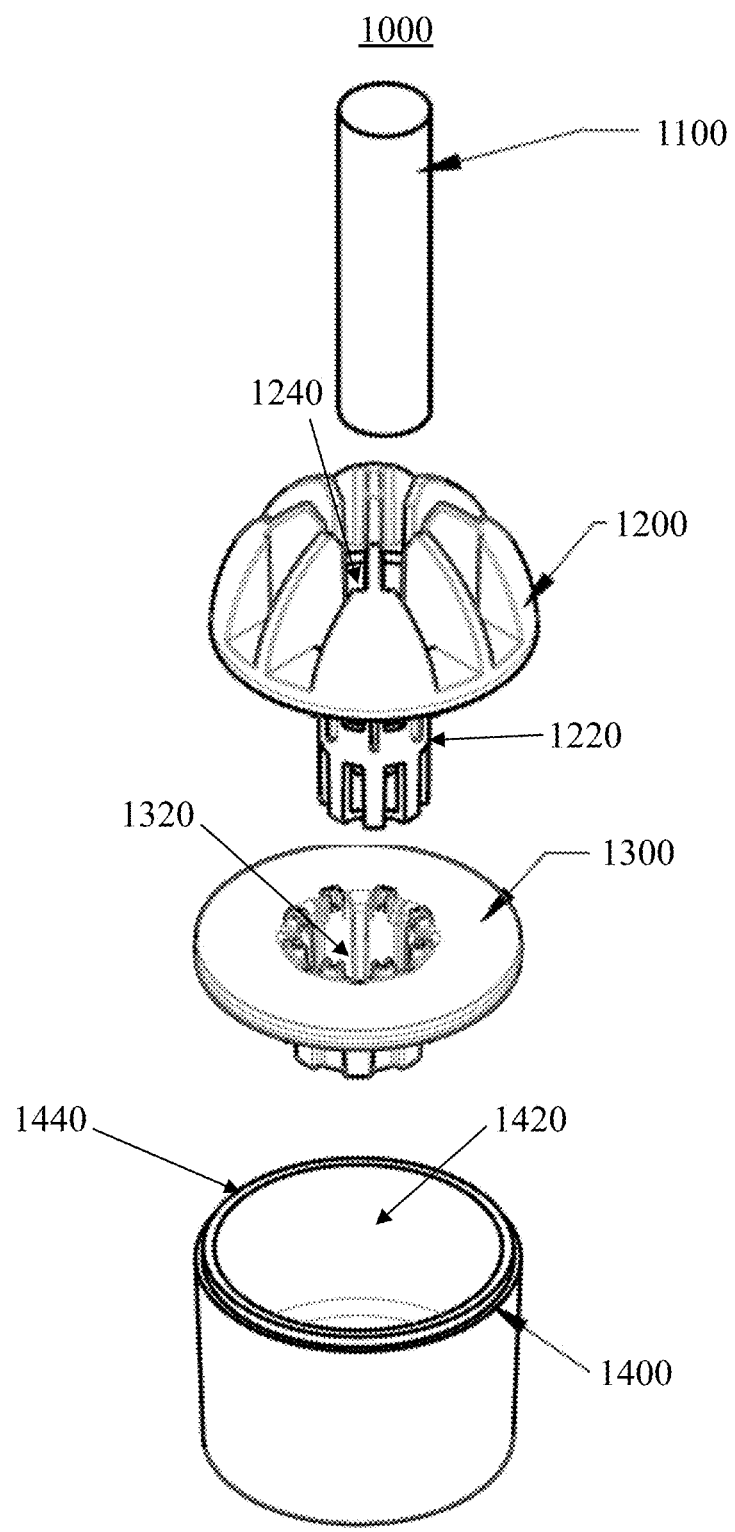
FIG. 1 is an exploded view of an exemplary embodiment of a system 1000.

Certain exemplary embodiments can provide a system comprising a tub, a cover, a wick, and a diffuser cap. The tub defines a cavity. The tub is constructed to hold a liquid in the cavity. The tub comprises a top ring. The cover is constructed to be coupled to the top ring of the tub. The cover defines an aperture. The wick is constructed to convey a liquid via diffusion. The diffuser cap comprises a central stem. The central stem is constructed to engage with the wick. The diffuser cap is constructed to vent vapor conveyed to the diffuser cap via the wick.

Certain exemplary embodiments provide devices, systems, and/or methods for pest control. Certain exemplary embodiments can be called a "Pest Chaser" unit, which is a self-contained unit. Certain exemplary embodiments can be injected molded and/or manufactured with a tub-like reservoir (the "Tub") that can harbor essential oils to be diffused through a wicking action as part of a system. When deployed, the oil is diffused in measured vapor quantities, which acts as a deterrent to various pests. The advantage of the Pest Chaser unit is its continuous-feed system constructed for oil diffusion in a measured, consistent quantity, which causes the capacity of the Tub and the wick density and composition to determine a length of time before the Tub is depleted. The length of time can be anywhere from one to six months, depending on the size of the Tub, the material, density, and size of the wick used, the size of the exposed surface of the wick to its surroundings, and the choice and properties of the essential oils. The components and a few comments about the oil, which can be designated by the pest being deterred, are discussed further herein.

A cap (the "Cap") can comprise a hard, non-permeable plastic such as polypropylene, in a mushroom-like shape—a exemplary embodiment can be approximately 1.5 inches tall. A "Cap" top part can be approximately 2 inches in diameter across the cap, and approximately 0.8 inch from the base of the Cap to the top. In such embodiments, a distance from the "stem" to a base of the Cap is of approximately 0.7 inches. The top of the Cap can define four vent-like slits extending from the top of the cap in a crosshairs design. The "Stem" can be a middle-extended tube with serrations on a distal end. The Stem houses a wick, which transfers oil from the tub up the wick and out the top of "Cap" vents. Underneath and extending from the base of the Cap are two pins that hold the Cap in place in the Cover until a user is ready to deploy the product. In certain exemplary embodiments, two metal pins shown can be replaced with molded-in-place plastic pins. In an alternative embodiment, the pins can be replaced by eight "Ribs" incorporated into an exterior of the stem and would nestle into corresponding slots (e.g., eight slots) in the Cover, noted below, in the pre-deployment stage. The stem's distal end in this configuration can have a pointed, spike-like tip with eight vertical vents of approximately $\frac{1}{16} \times \frac{1}{4}$ inch near the distal end, on the perimeter of the stem.

The Cover can comprise a hard, non-permeable plastic such as polypropylene, in a round, disk-like shape with a raised cylinder in the middle. In certain exemplary embodiments, the disk part can be approximately 2 inches in diameter and approximately $\frac{1}{16}$ inch thick. The cylinder section, which houses the wick, can be approximately 0.8 inch from base of disc section, and approximately 0.8 inch in diameter; the thickness of the walls of the cylinder can be approximately 0.05 inch thick. In assembly, the Cover can be ultrasonically welded to tub (the "Tub") (see below) on a perimeter of a bottom edge of a disc section. The Cap can rest on the Cover, with a stem (the "Stem") section of the Cap inserted into a cylinder section of the Cover. Certain exemplary embodiments define two anchor holes and blind holes that accept the two molded plastic pins on the Cap when the Cap and Cover come together as the Pest Chaser is assembled in production, and deployed by the user.

In certain exemplary embodiments, the Cover can define two series of slots, eight for the pre-deployment stage, each approximately ¼ inch deep, and a second series of eight (alternating with the first series) approximately ⅞ inches deep, which allow for the deployment of the product. The slots are located on the interior perimeter of the cylinder.

A tub (the "Tub") can comprise a clear hard, non-permeable plastic. The Tub can hold one or more essential oils. The Tub can be approximately ⅞ inches tall and approximately 2 inches in diameter, with the outer rim being approximately 1/16 inch thick. The plastic can be translucent so that the user can see an amount of oil in the Tub and monitor a depletion rate thereof. In production the Cover will be ultrasonically welded to the Tub after the measured amount of oil has been added taking care not to get any oil on the areas, which can be welded. With the Seal in place the Tub, Cover, and Seal becomes a completely sealed three-part unit capturing approximately 9 or 10 ml of oil introduced before the ultrasonic assembly step takes place. The Tub can have a slightly concave interior floor, which would allow all the oil to drain to the center-based wick, when deployed, when the unit is situated on a substantially flat, level surface.

The Seal comprises a material, which can be die-cut in the shape of a substantially flat disc and applied to the distal rim of a Cylinder on the Cover. The disc and proper adhesive will allow the Seal to be applied, or possibly ultrasonically welded to the Cylinder. Possible materials for the Seal can be aluminum, similar in thickness to aluminum foil, that would make it easy for the end user to "break the Seal" by applying light downward pressure to the Cap when deploying the device.

In other embodiments, the Seal can incorporate a thinner grade of the polypropylene into the Cover in a space where aluminum seal creates a soft membrane that can break away upon pressure. Such an embodiment has an advantage of potentially simplifying a manufacturing process.

Certain exemplary embodiments comprise a breakaway, molded-in, plastic membrane Seal.

The wick (the "Wick") determines a diffusion rate of oils (e.g., essential oils) and can comprise a synthetic material, such as sintered polypropylene or a porous polymeric fiber. Certain exemplary embodiments can be approximately the size and shape of a cigarette filter. In certain exemplary embodiments (using certain dimensions noted in the other components above) the Wick can be approximately 1⅜ inches tall and approximately ¾ inches in diameter. It would fit snugly on the inside of the stem cylinder of the Cap, but not too snugly as to compress the fibers and compromise the diffusion flow rate of essential oil from the Tub into the atmosphere. The density of the fibers and the material of the wick would determine the actual flow rate under normal temperature and atmospheric conditions which would be common to the end usage of the product. A targeted flow rate would determine the depletion time frame of the oil in the Tub and determine the lifetime duration of the product for marketing purposes.

In certain exemplary embodiments, certain essential oils can act as pest deterrents, including for mice. One potential oil for this purpose is peppermint oil, although other essential oils, such as balsam and cinnamon, can also be used. Most products use either sawdust pouches soaked in the oil or spray applicators as the delivery device. These products can last two weeks to a month before they dry up and/or lose effectiveness. The Pest Chaser differs from certain other systems in its use of a continuous-flow application of the essential oil through a wicking system. This allows the oil to be meted out continuously, allowing for a much more durable and consistent product lifetime. In certain exemplary embodiments, the Pest Chaser unit can have a lifetime of approximately three to five months for an exemplary peppermint oil application.

As assembled, the Cap of the Pest Chaser sets atop the welded Cover/Tub assembly. The two pins rest in the anchor holes, and the Wick is snugly nestled in the stem cylinder. This configuration creates a small gap between the bottom rim of the Cap and a top side of the Cover. A Cylinder of the Cap has the Seal securing oil in the Tub. The configuration of the anchor holes allows a serrated distal end of the Cap to be a small distance (e.g., approximately 0.2 inches) from the Seal, keeping the Seal intact. Certain exemplary embodiments incorporate ribs on the Stem and slots on the interior of the cylinder of the Cover has a similar pre-deployment configuration, with a small gap. Such embodiments utilize a lift and slight twisting action (as opposed the 90 degrees of twisting), then pressing, to puncture the seal.

In deployment, the user can lift the Cap and rotate the Cap approximately 90 degrees to align the pins with the blind holes and then press down. This action causes the Seal to break away from the Cylinder in the Cap and releases oil into the Wick. The Seal can drift away into the Tub. Because of the rotate and press action, the aforementioned gap between the Cap and Cover disappears.

Certain exemplary embodiments utilize a lift-and-twist movement, although the rotation is significantly less than 90 degrees. Instead, the user can gently lift and rotate slightly until finding a next, significantly deeper slot and then add downward pressure to complete the breaking of the Seal and the release of the oil. In such embodiments, the oil is absorbed through the eight vents in the lower part of the stem, as opposed to the bottom of the wick in other embodiments. In certain exemplary embodiments the seal is specifically incorporated into the Top, as a thinner layer of the same material of the top (such as polypropylene). The actual design of the internal seal face can be a circle with four evenly spaced diameter cuts forming eight 'flaps', similar to a pizza with eight slices. The cuts will be of a thinner nature than the rest of the seal membrane. Upon deployment of the pressing action when the pointed tip of the stem strikes the center of the membrane, the eight flaps will fold back, aligning with the solid (non-vent) parts of the stem. This allows for oil in the tub to quickly saturate the wick through the vents.

Unique features of certain exemplary Pest Chaser units comprise:
- The Pest Chaser unit in general as a pest deterrent delivery system comprising a Tub that holds a "free liquid" and utilizes a porous wick for diffusion of said liquid.
- A delivery system where a liquid Tub is sealed until the time of use where it is activated by puncturing a seal releasing liquid from the liquid Tub. The seal can be extruded as part of the Tub cap or a secondary material, such as foil, attached to the Tub cap.
- The capability of the sealed and filled Tub/Cover unit as a refillable unit that the user could potentially reuse.
- The concave bottom of the Tub allowing all the oil to flow down to the center-based wick, allowing substantially all the oil to be utilized.
- The design allows the unit to be configured in different shapes and sizes, to accommodate the job expectation and environment in which it is to be deployed.

FIG. 1 is an exploded view of an exemplary embodiment of a system 1000, which comprises:

a wick 1100, wick 1100 is constructed to convey a liquid via diffusion;

a diffuser cap 1200, diffuser cap 1200 comprises a central stem 1220, diffuser cap 1200 defines a first aperture 1240, wick 1100 is constructed to slidably engage with first aperture 1240 of diffuser cap 1200, central stem 1220 is constructed to engage with wick 1100, diffuser cap 1200 is constructed to vent vapor conveyed to diffuser cap 1200 via wick 1100;

a cover 1300, cover 1300 defines a second aperture 1320, wherein diffuser cap 1200 is constructed to slidably engage with second aperture 1320 of cover 1300;

a tub 1400, tub 1400 defines a cavity 1420, tub 1400 is constructed to hold a liquid in cavity 1420, tub 1400 comprises a top ring 1440, wherein cover 1300 is constructed to be coupled to top ring 1440 of tub 1400.

In certain exemplary embodiments, diffuser cap 1200 is releasably coupleable to cover 1300. In certain exemplary embodiments, tub 1400 has a substantially circular cross-section. In other exemplary embodiments, tub 1400 has a substantially rectangular cross-section. In other exemplary embodiments, tub 1400 has a substantially pentagonal cross-section.

Figure 2:
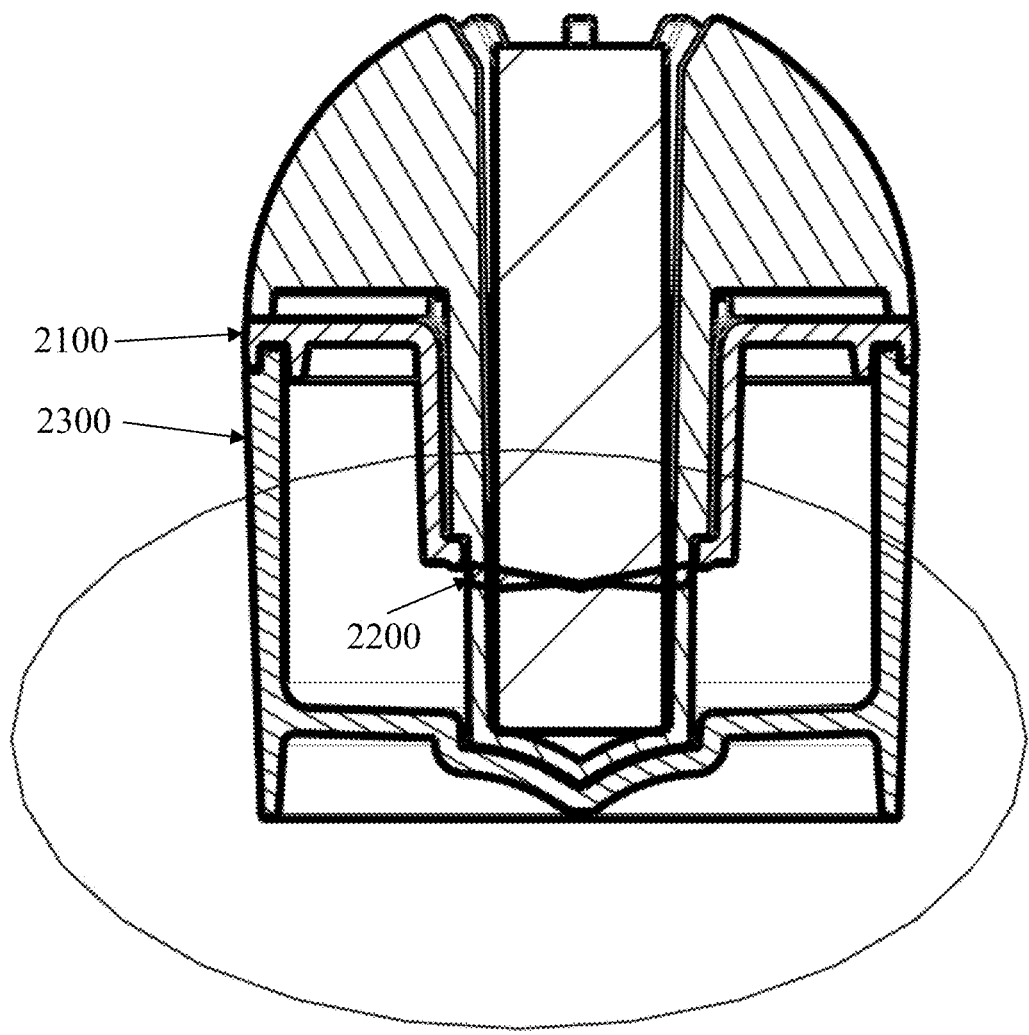
FIG. 2 is a sectional view of an exemplary embodiment of a system 2000.

FIG. 2 is a sectional view of an exemplary embodiment of a system 2000, which comprises a cover 2100. In certain exemplary embodiments, cover 2100 comprises a seal 2200. Seal 2200 is constructed to resist flow of the liquid from a tub 2300 until seal 2200 is broken. In certain exemplary embodiments, tub 2300 is releasably coupleable to cover 2100. In certain exemplary embodiments, seal 2200 is coupleable to cover 2100. Seal 2200 is constructed to resist flow of the liquid from tub 2300 until seal 2200 is broken.

Figure 3:
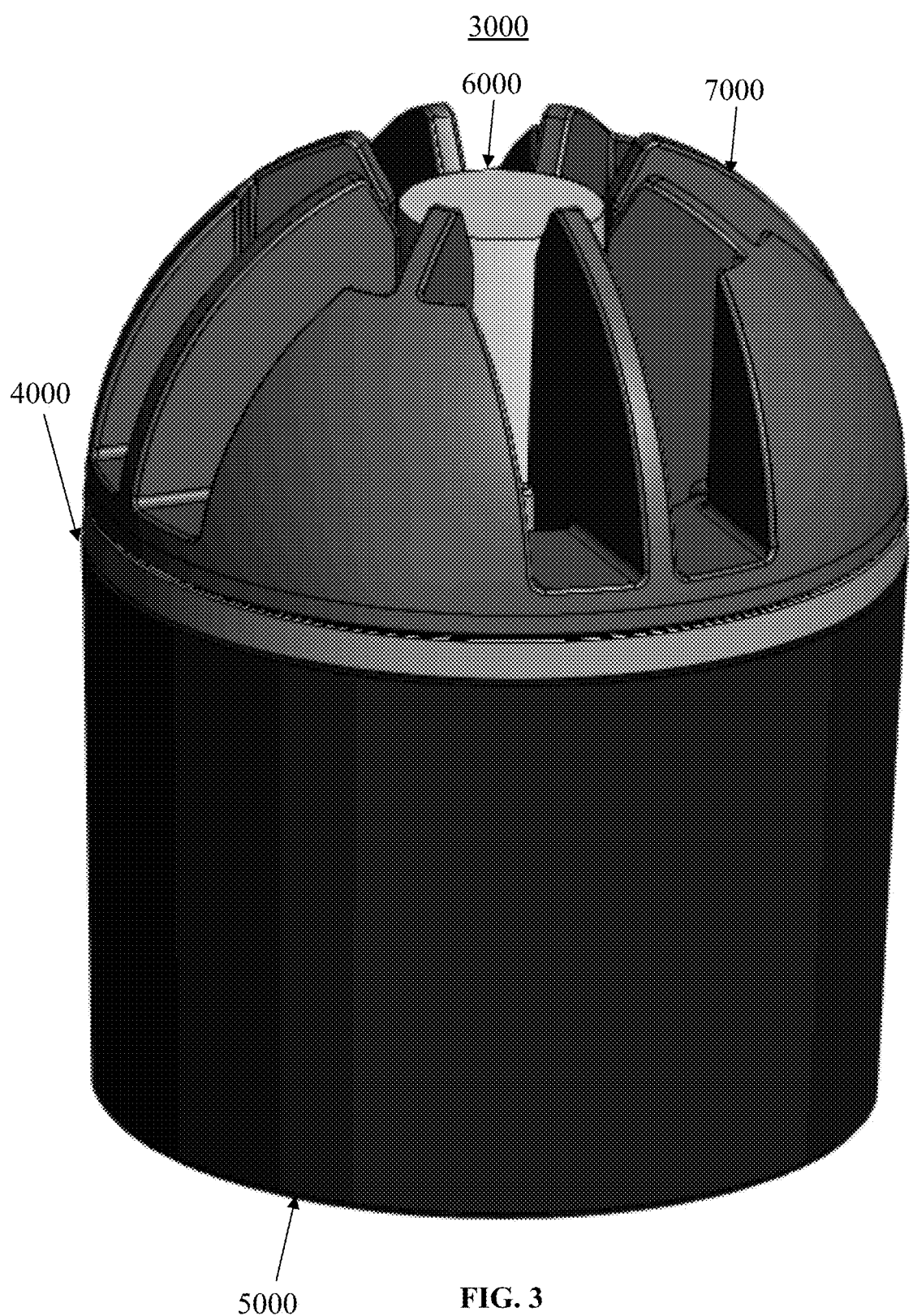
FIG. 3 is a perspective view of an exemplary embodiment of a system 3000.

FIG. 3 is a perspective view of an exemplary embodiment of a system 3000, which comprises a cover 4000, a tub 5000, a wick 6000, and a diffuser cap 7000.

Figure 4:
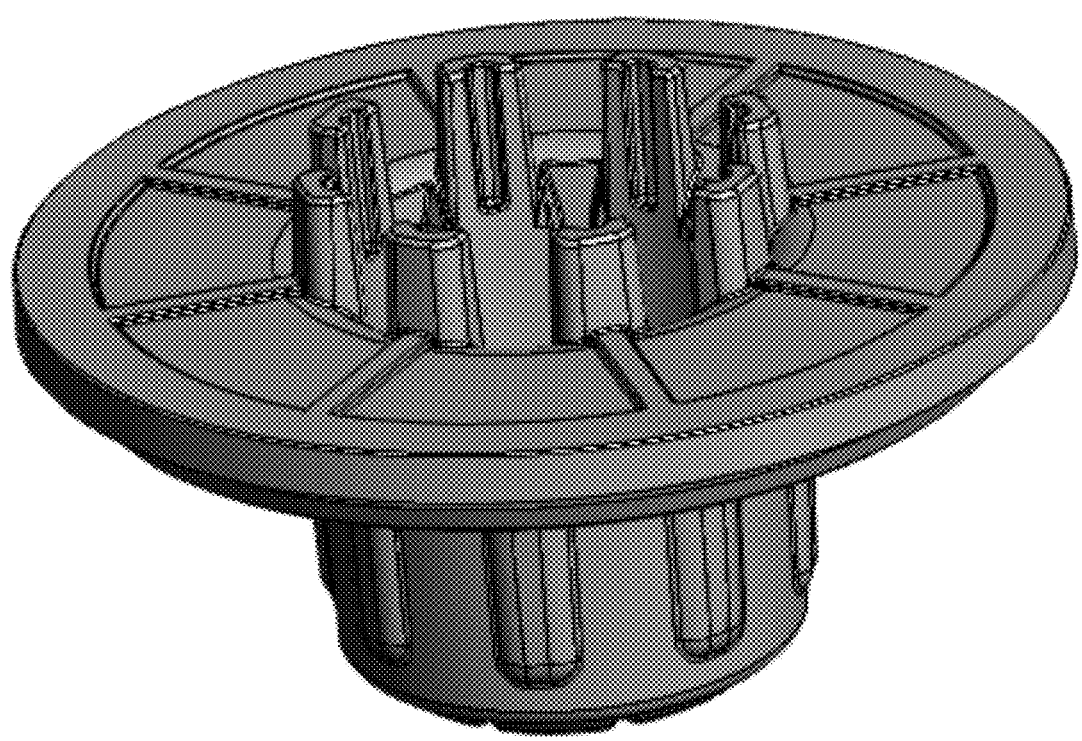
FIG. 4 is a perspective view of an exemplary embodiment of a cover 4000.

FIG. 4 is a perspective view of an exemplary embodiment of cover 4000.

Figure 5:
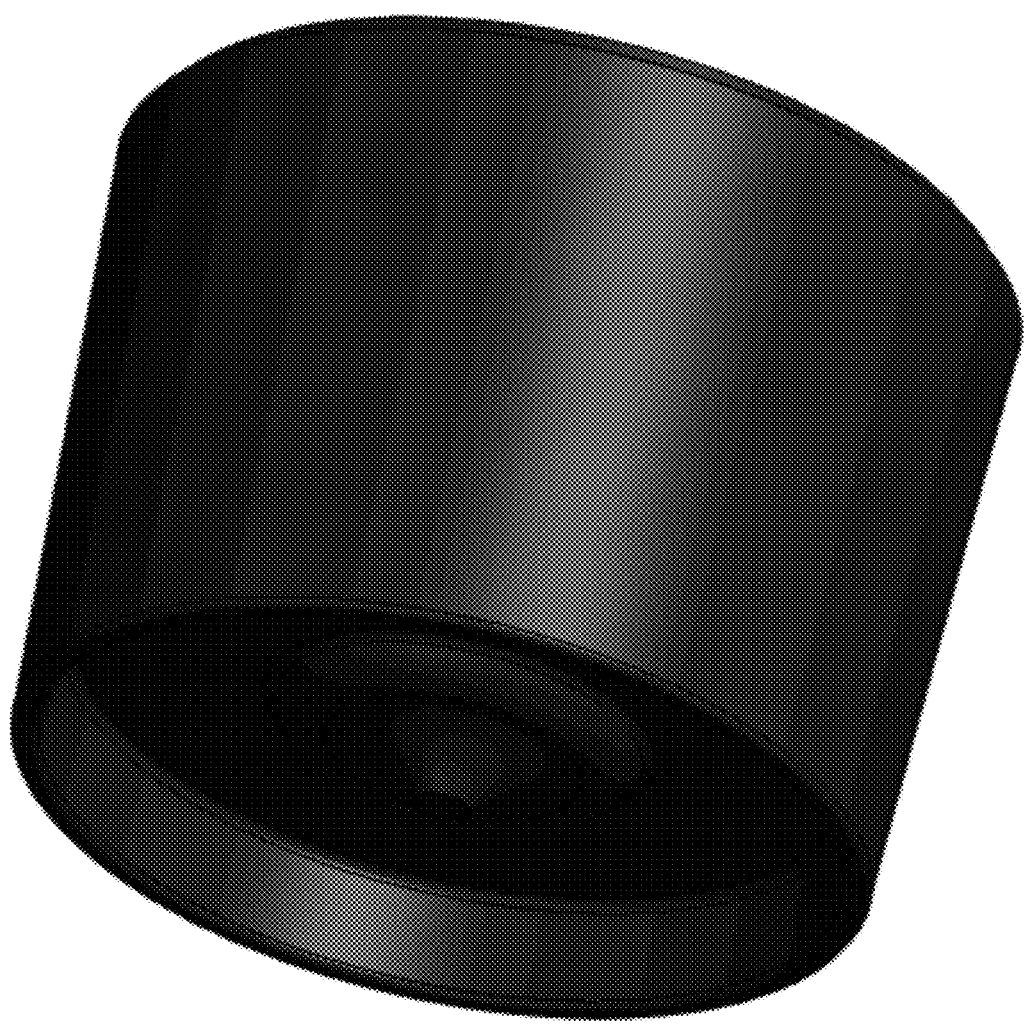
FIG. 5 is a perspective view of an exemplary embodiment of a tub 5000.

FIG. 5 is a perspective view of an exemplary embodiment of tub 5000.

Figure 6:
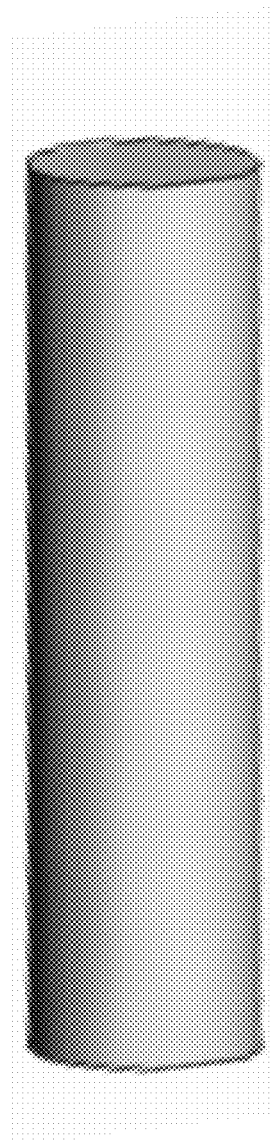
FIG. 6 is a perspective view of an exemplary embodiment of a wick 6000.

FIG. 6 is a perspective view of an exemplary embodiment of wick 6000.

Figure 7:
FIG. 7 is a perspective view of an exemplary embodiment of a diffuser cap 7000.

FIG. 7 is a perspective view of an exemplary embodiment of diffuser cap 7000.

Figure 8:
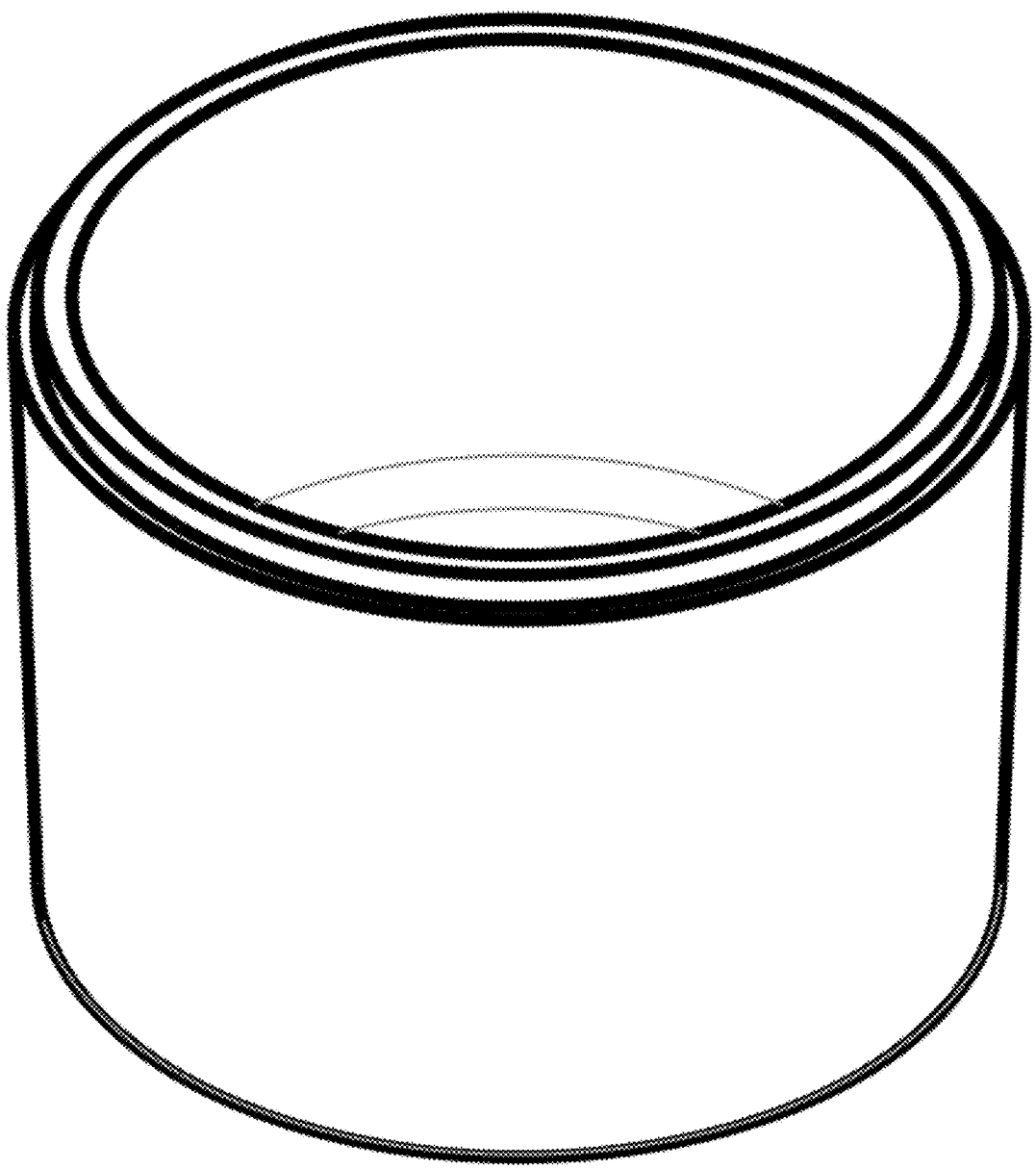
FIG. 8 is a perspective view of an exemplary embodiment of a tub 8000.

FIG. 8 is a perspective view of an exemplary embodiment of a tub 8000.

Figure 9:
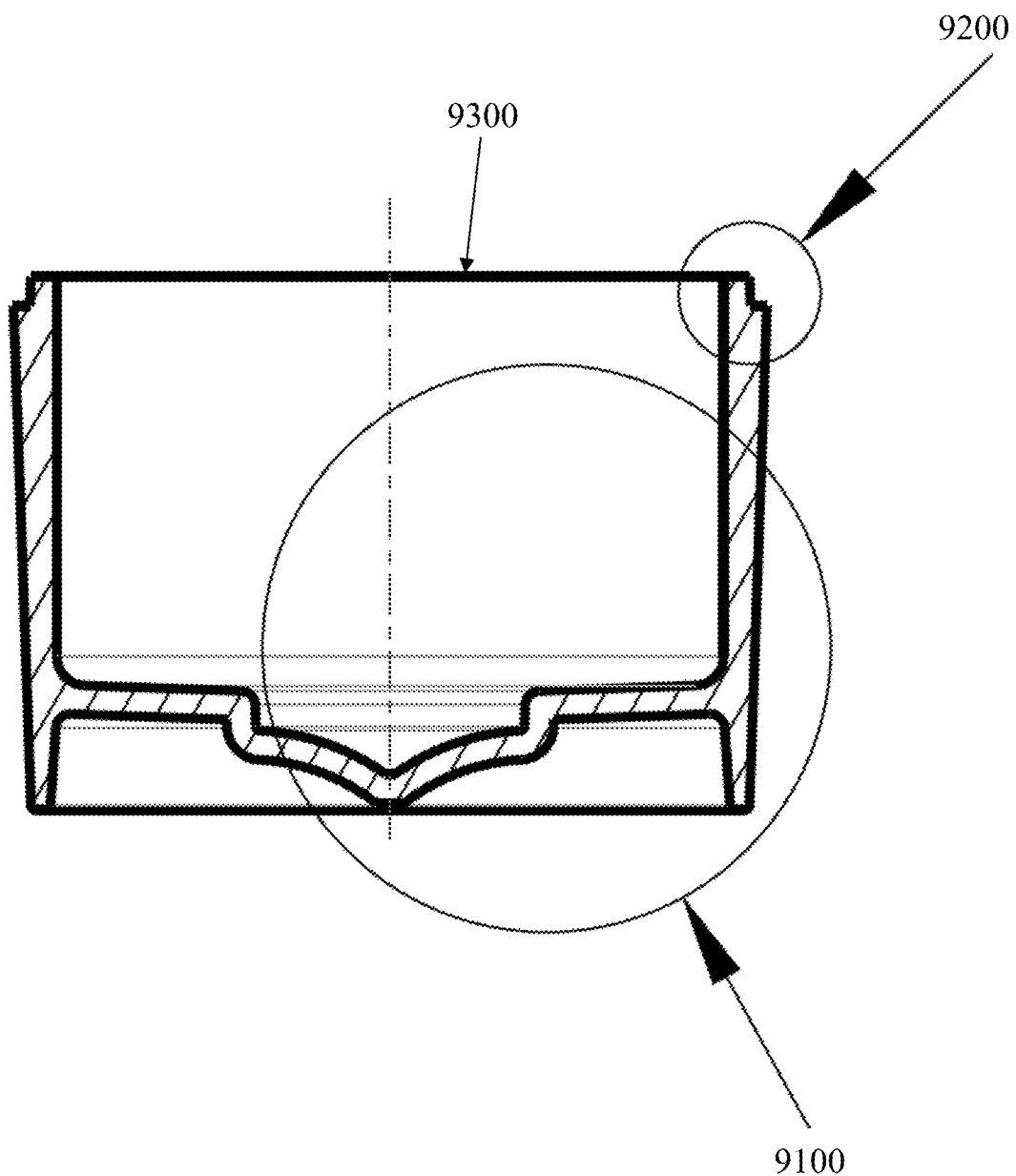
FIG. 9 is a sectional view of an exemplary embodiment of a tub 9000.

FIG. 9 is a sectional view of an exemplary embodiment of a tub 9000. In certain exemplary embodiments, tub 9000 has a concave bottom 9100 such that substantially all liquid in the tub flows to a wick (see, e.g., wick 1100 of FIG. 1) as tub 9000 empties. Tub 9000 comprises a top ring 9200.

Figure 10:
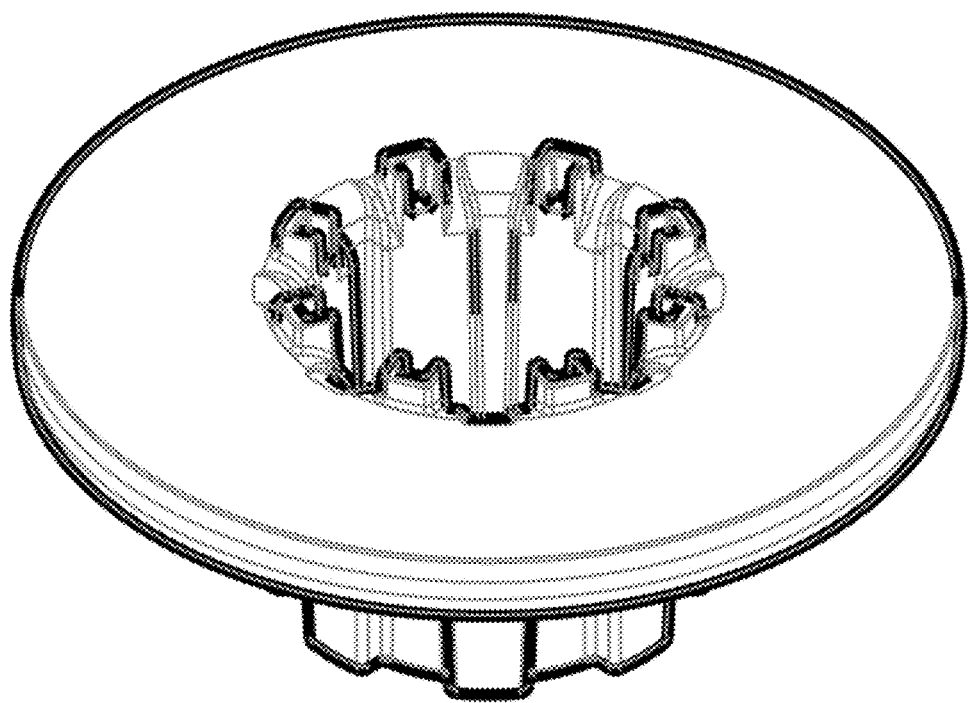
FIG. 10 is a perspective view of an exemplary embodiment of a cover 10000.

FIG. 10 is a perspective view of an exemplary embodiment of a cover 10000.

Figure 11:
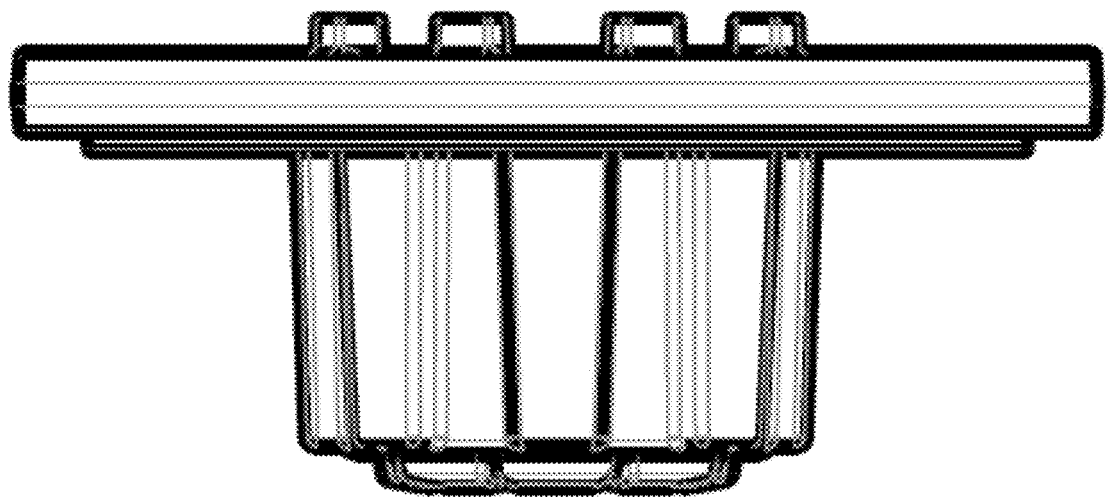
FIG. 11 is a sectional view of an exemplary embodiment of a cover 11000.

FIG. 11 is a sectional view of an exemplary embodiment of a cover 11000.

Figure 12:
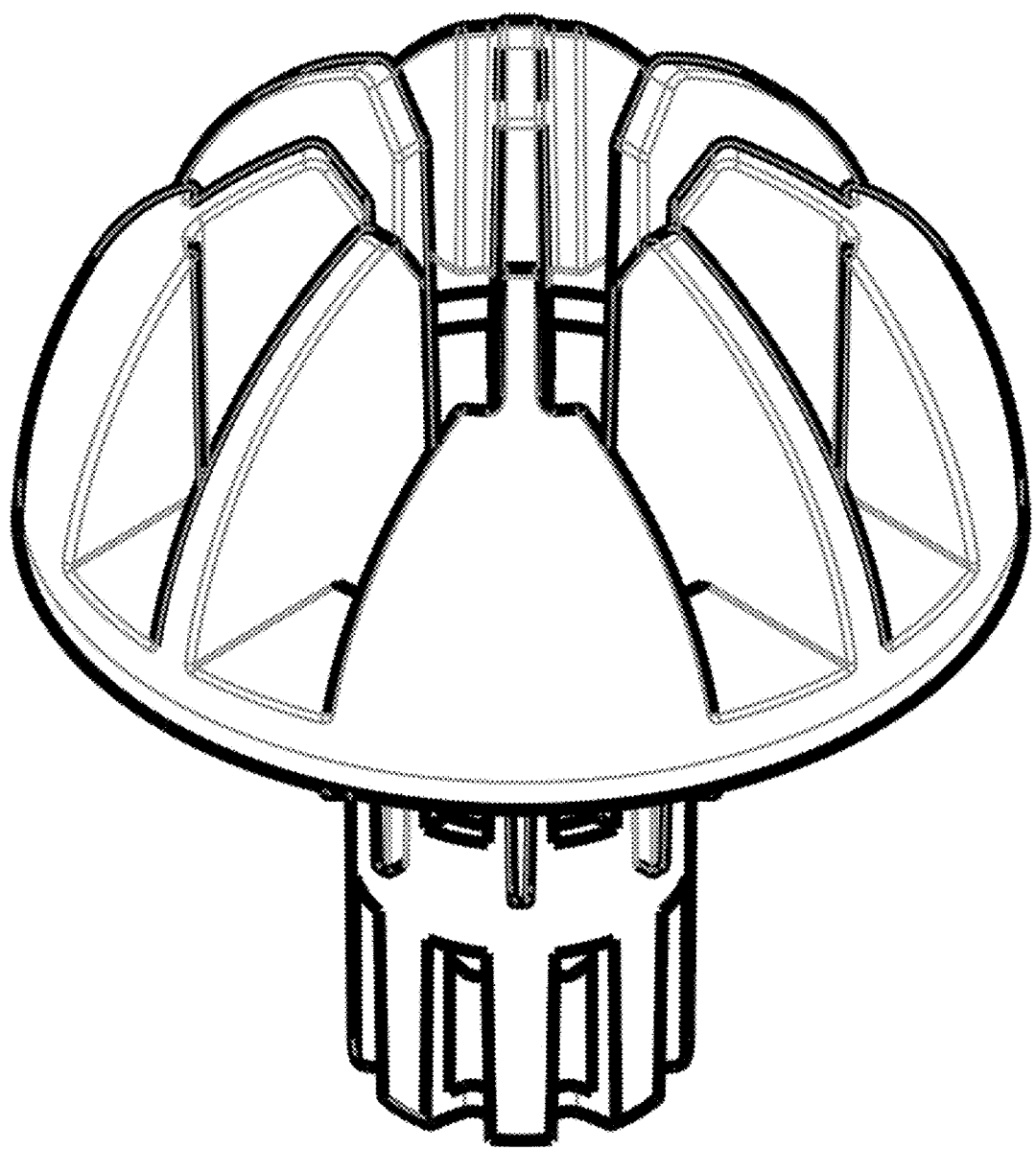
FIG. 12 is a perspective view of an exemplary embodiment of a diffuser cap 12000.

FIG. 12 is a perspective view of an exemplary embodiment of a diffuser cap 12000.

Figure 13:
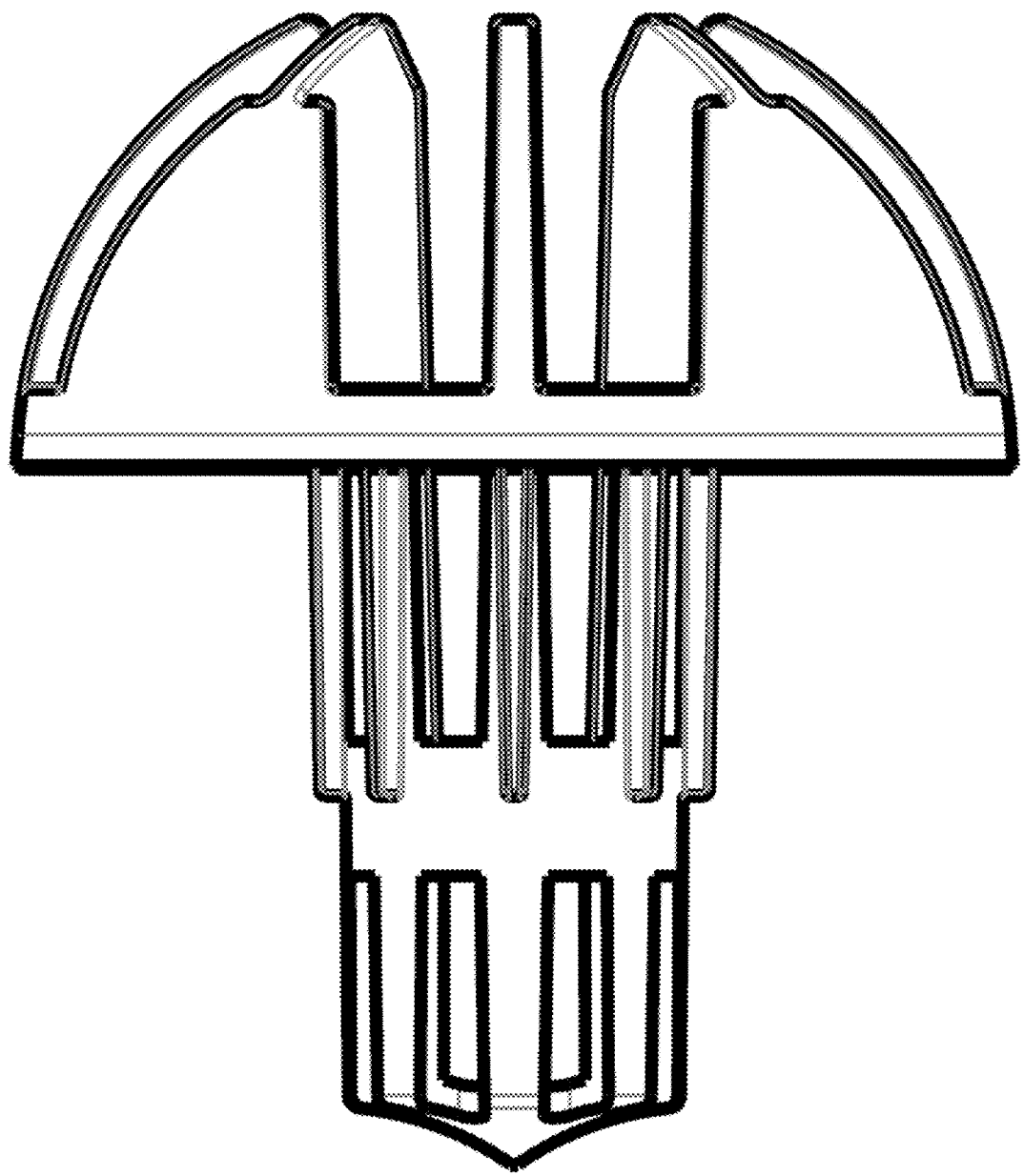
FIG. 13 is a sectional view of an exemplary embodiment of a diffuser cap 13000.

FIG. 13 is a sectional view of an exemplary embodiment of a diffuser cap 13000.

Figure 14:
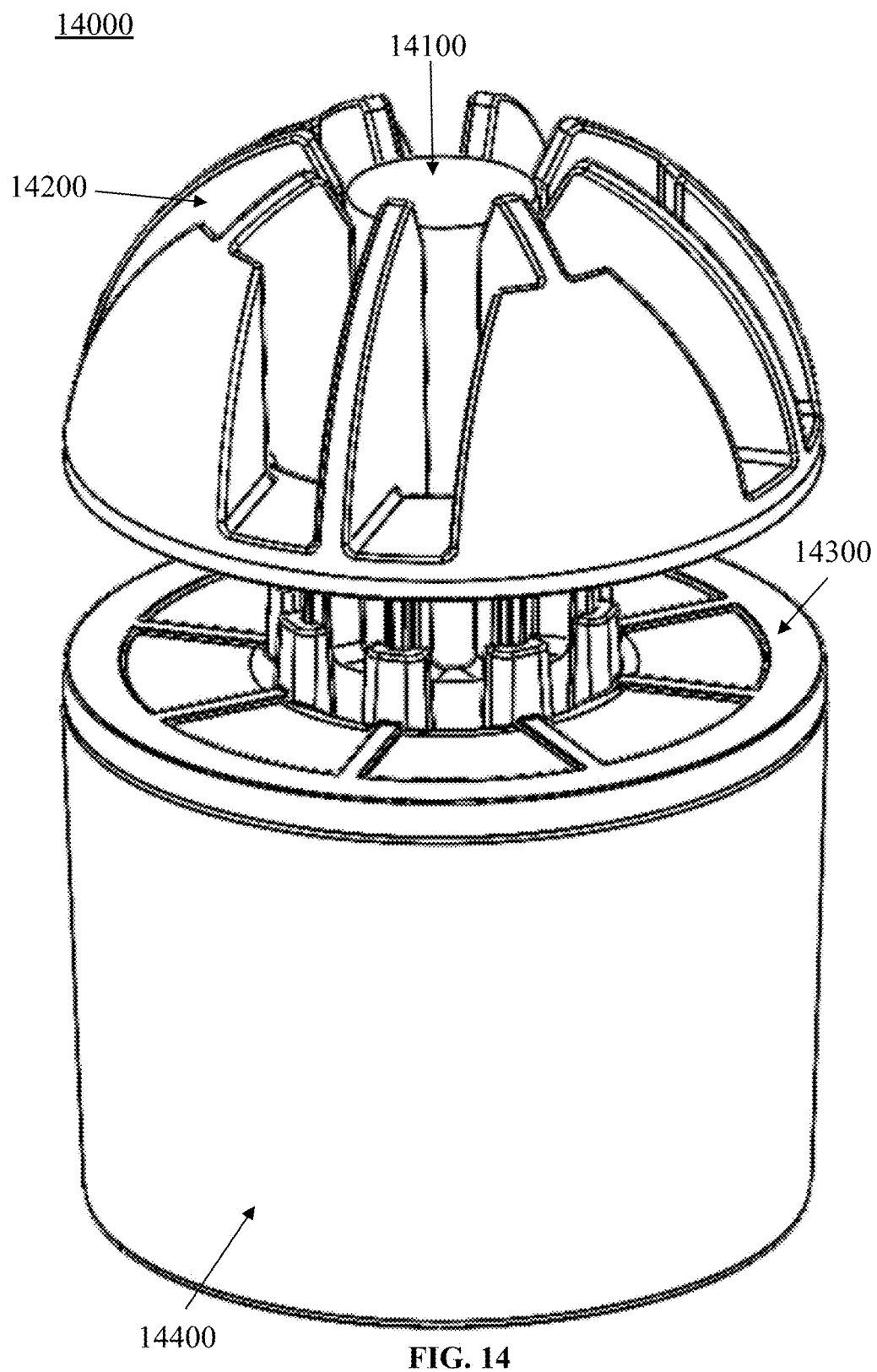
FIG. 14 is a perspective view of an exemplary embodiment of a system 14000.

FIG. 14 is a perspective view of an exemplary embodiment of a system 14000, which comprises a wick 14100, a diffuser cap 14200, a cover 14300, and a tub 14400.

Figure 15:
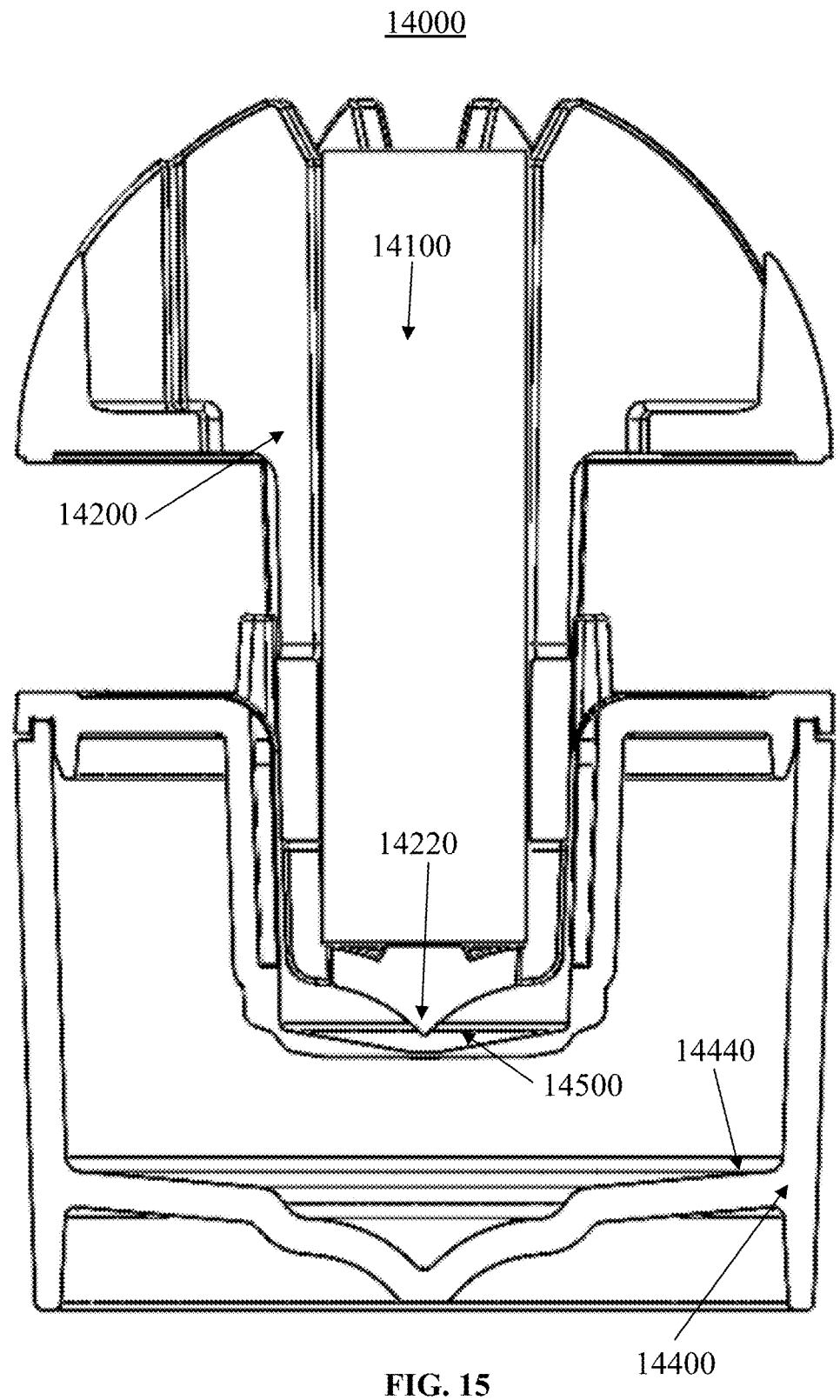
FIG. 15 is a sectional side view of system 14000.

FIG. 15 is a sectional side view of system 14000, which comprises a seal 14500. A pointed end 14220 of diffuser cap 14200 is constructed to break seal 14500 when diffuser cap 14200 is depressed (e.g., depressed by a user). Diffuser cap 14200 is depressed into tub 14400 until diffuser cap 14200 is in contact with a bottom surface 14440 of tub 14400. After seal 14500 is broken, a liquid stored in tub 14400 contacts wick 14100 and diffuses up wick 14100.

Figure 16:
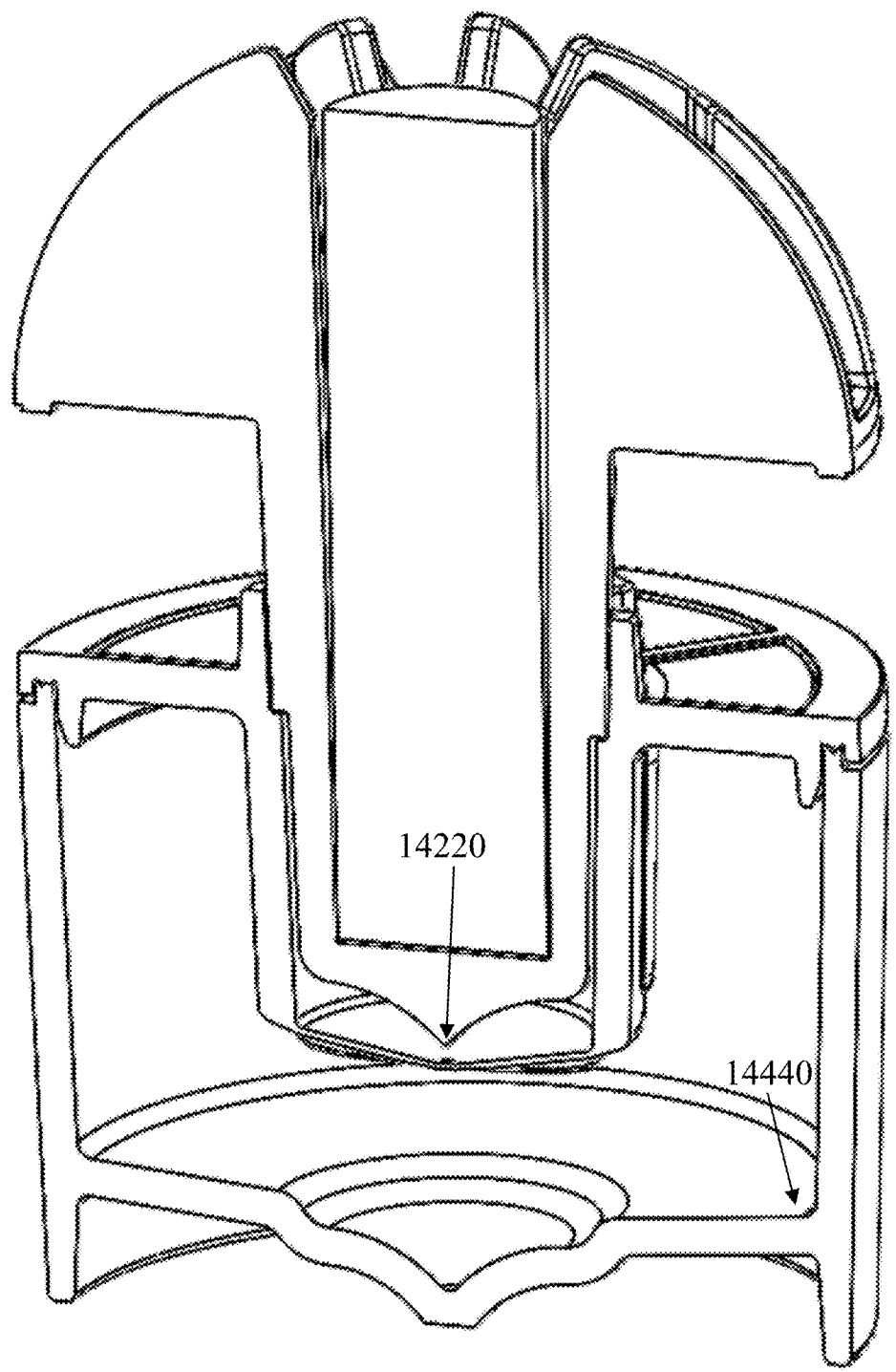
FIG. 16 is a sectional perspective view of system 14000.

FIG. 16 is a sectional perspective view of system 14000, which shows that a first contour of pointed end 14220 of diffuser cap 14200 substantially conforms to a second contour of bottom surface 14440 of tub 14400. Making first contour of pointed end 14220 of diffuser cap 14200 conform to second contour of bottom surface 14440 of tub 14400 allows for substantially all liquid held in tub 14400 to be utilized as system 14000 functions in pest control applications.

Figure 17:
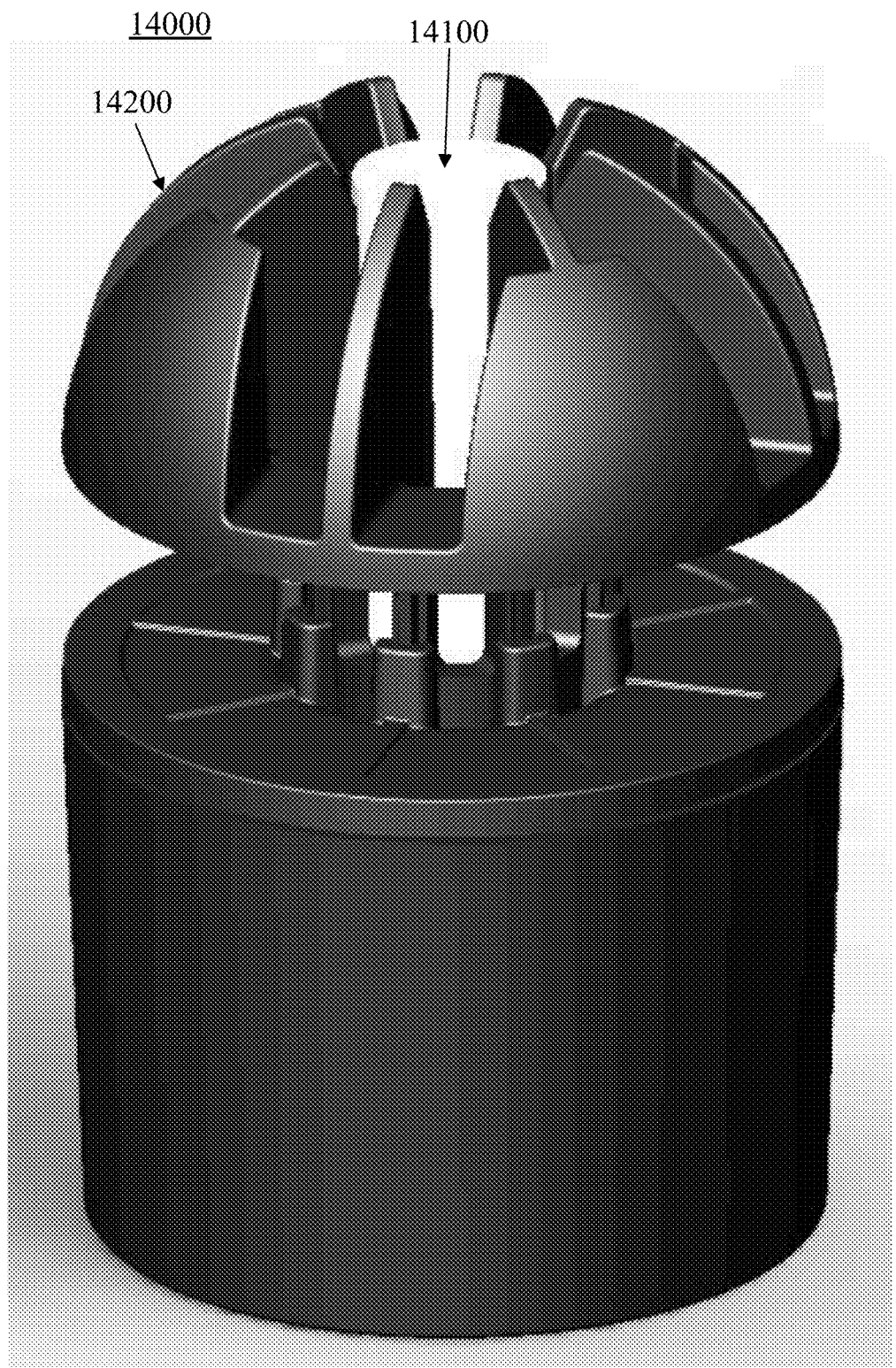
FIG. 17 is a perspective view of system 14000.

FIG. 17 is a perspective view of system 14000, which shows wick 14100 coupled to diffuser cap 14200.

Figure 18:
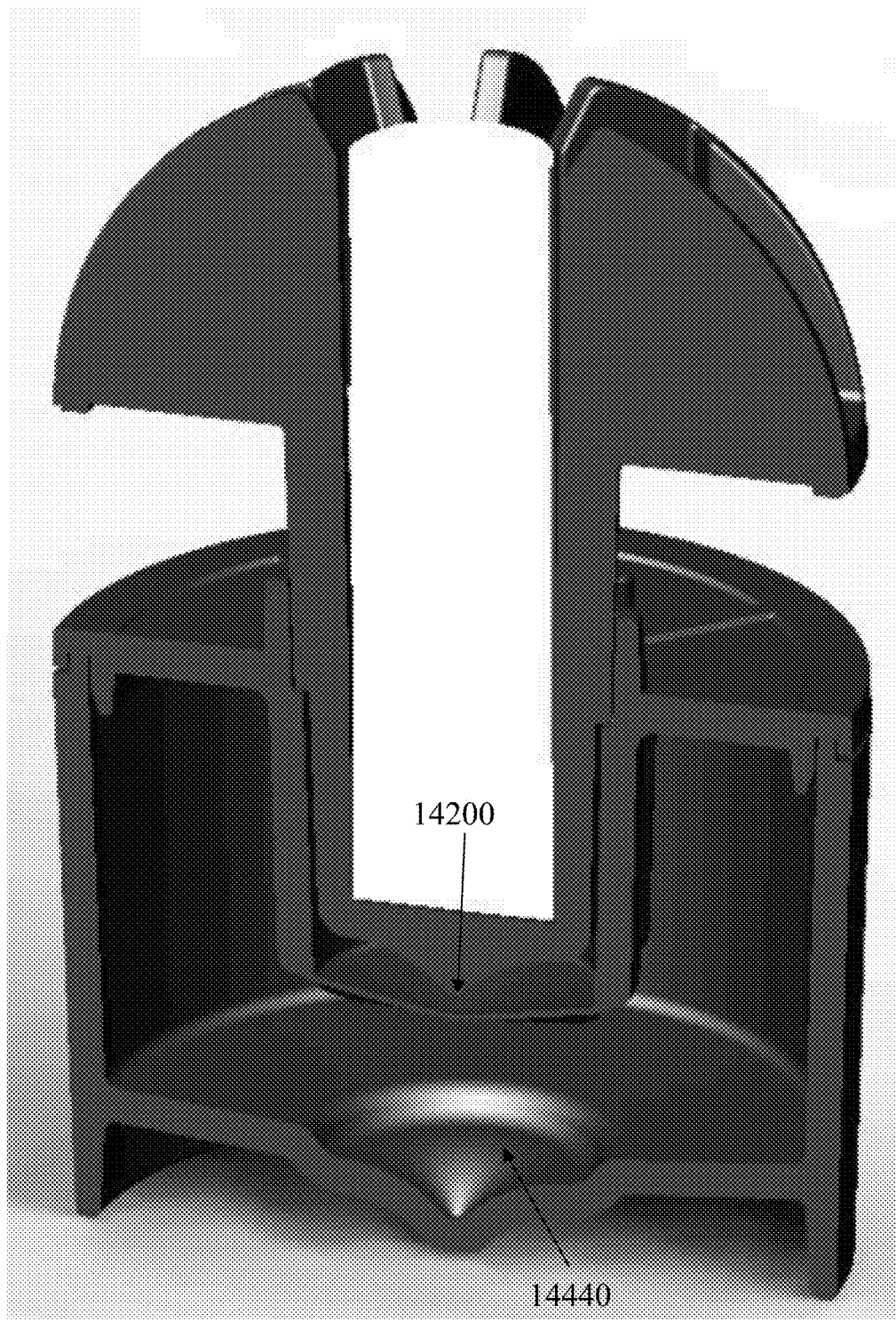
FIG. 18 is a sectional perspective view of system 14000.

FIG. 18 is a sectional perspective view of system 14000, which further illustrates that the first contour of pointed end 14220 of diffuser cap 14200 substantially conforms to the second contour of bottom surface 14440 of tub 14400

Figure 19:
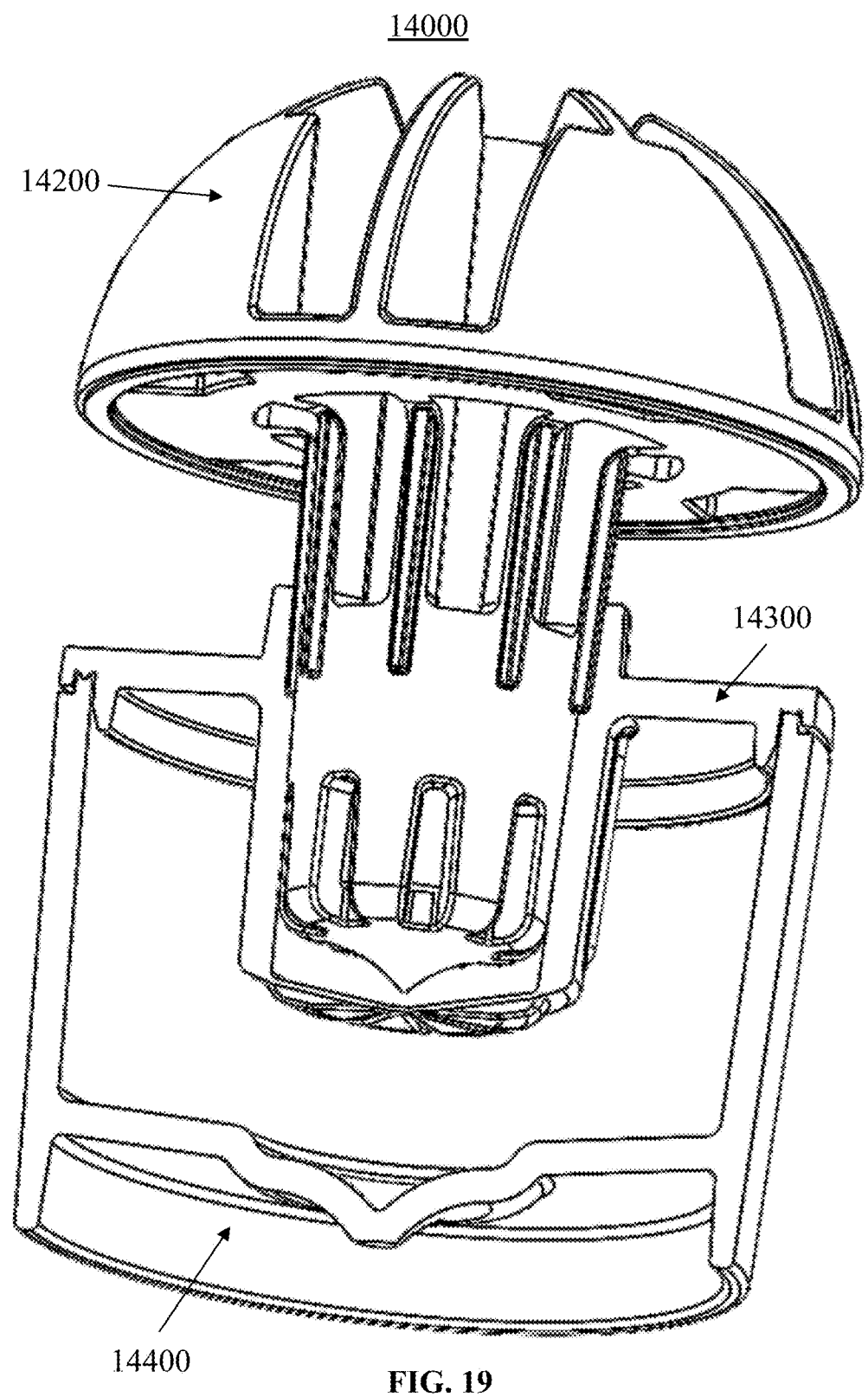
FIG. 19 is a sectional perspective view of system 14000.

FIG. 19 is a sectional perspective view of system 14000, which illustrates diffuser cap 14200, cover 14300, and tub 14400.

Figure 20:
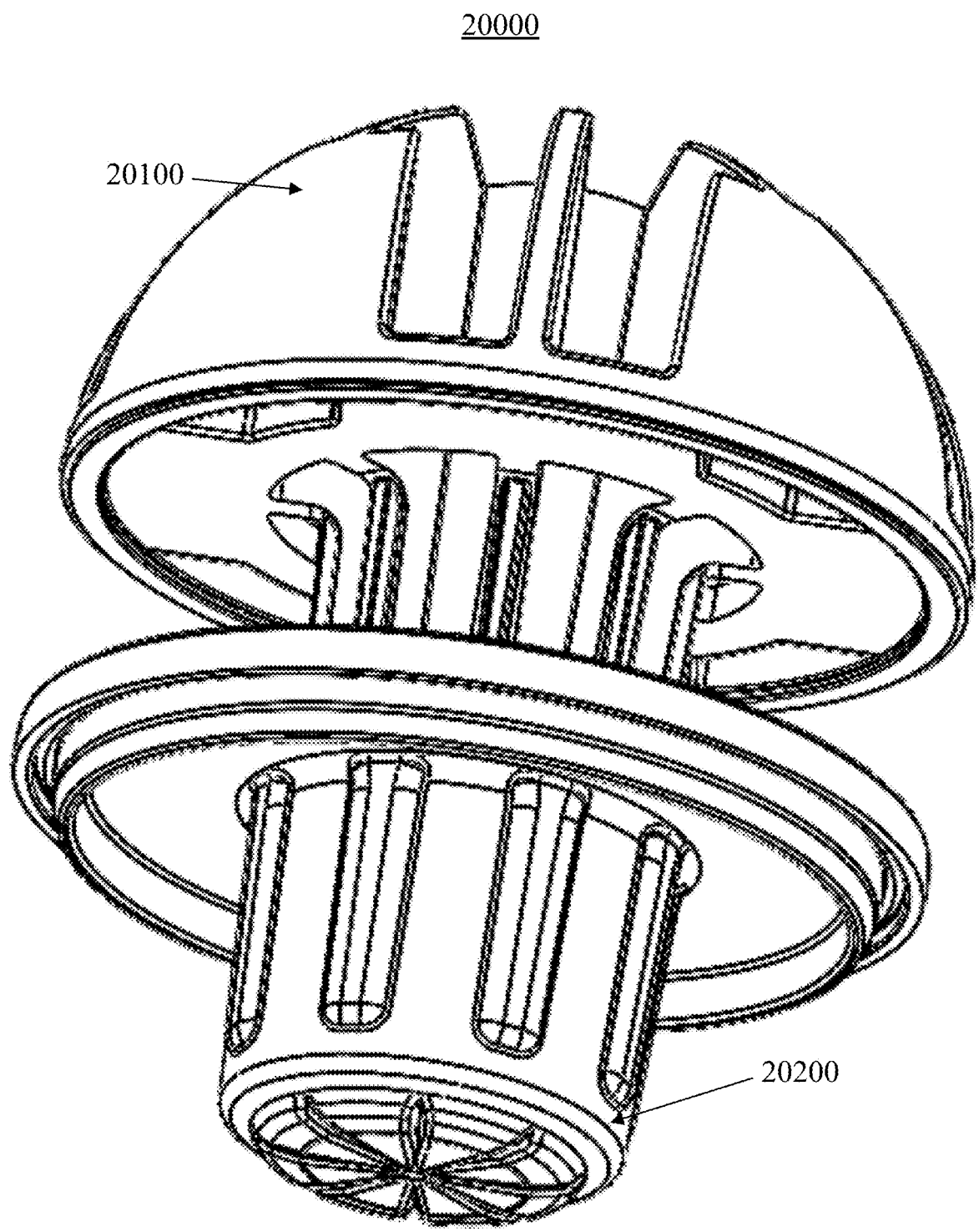
FIG. 20 is a perspective view of an exemplary embodiment of a system 20000.

FIG. 20 is a perspective view of an exemplary embodiment of a system 20000, which comprises a diffuser cap 20100 and a cover 20200.

Figure 21:
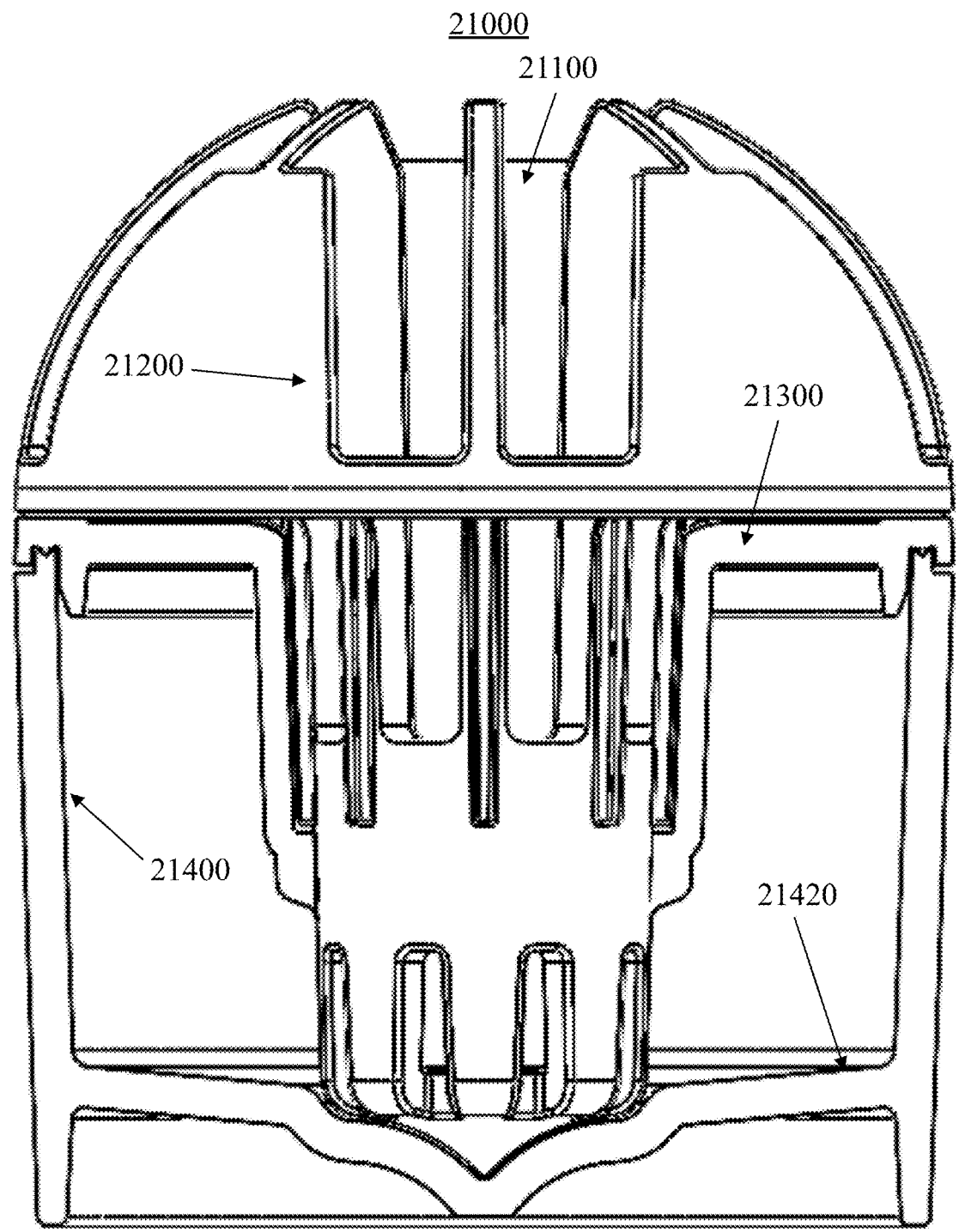
FIG. 21 is a sectional view of an exemplary embodiment of a system 21000.

FIG. 21 is a sectional view of an exemplary embodiment of a system 21000, which comprises a wick 21100, a diffuser cap 21200, a cover 21300, and a tub 21400. Diffuser cap 21200 is engaged and resting on a bottom surface 21420 of tub 21400.

Figure 22:
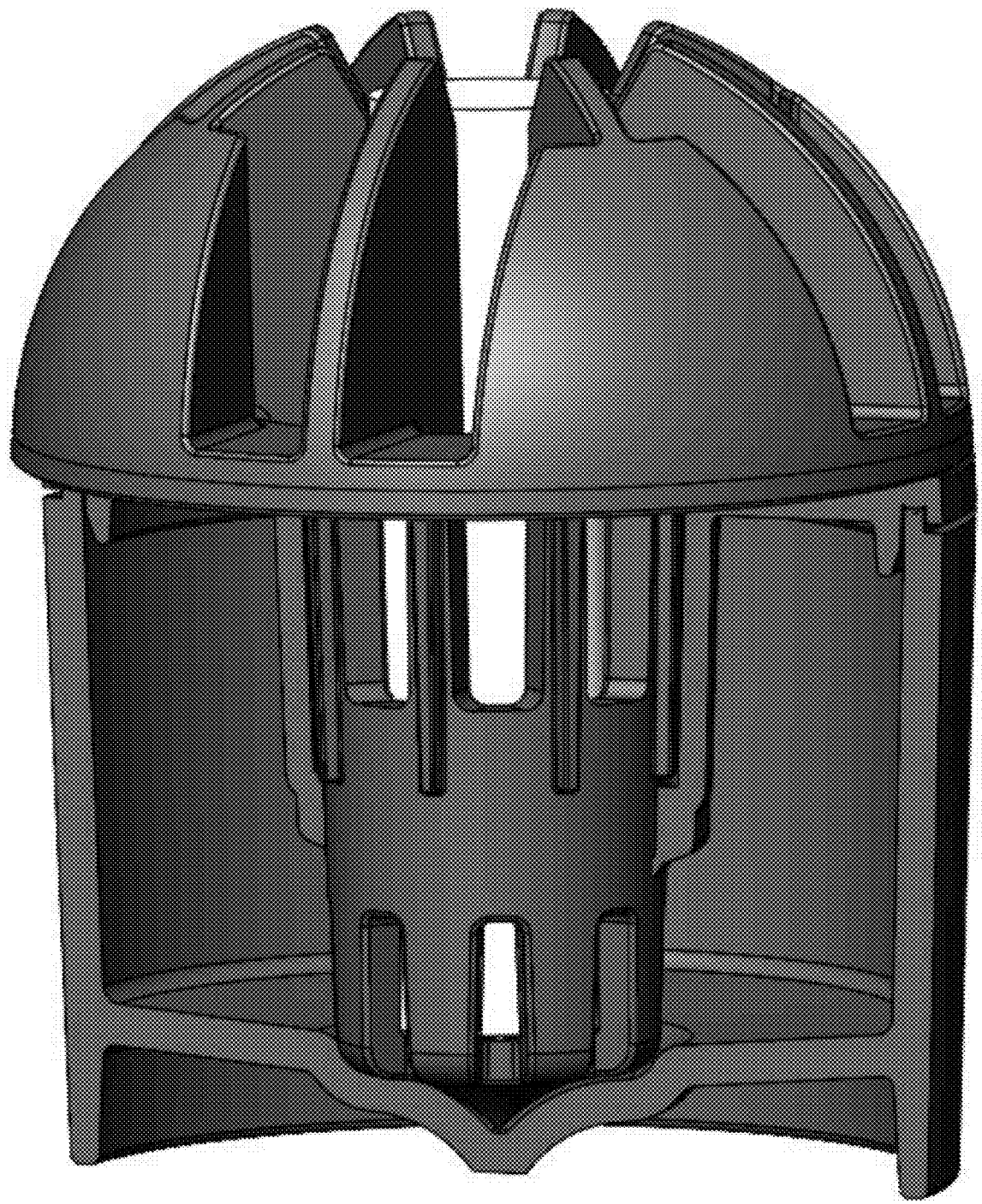
FIG. 22 is a perspective sectional view of system 21000.
Figure 23:
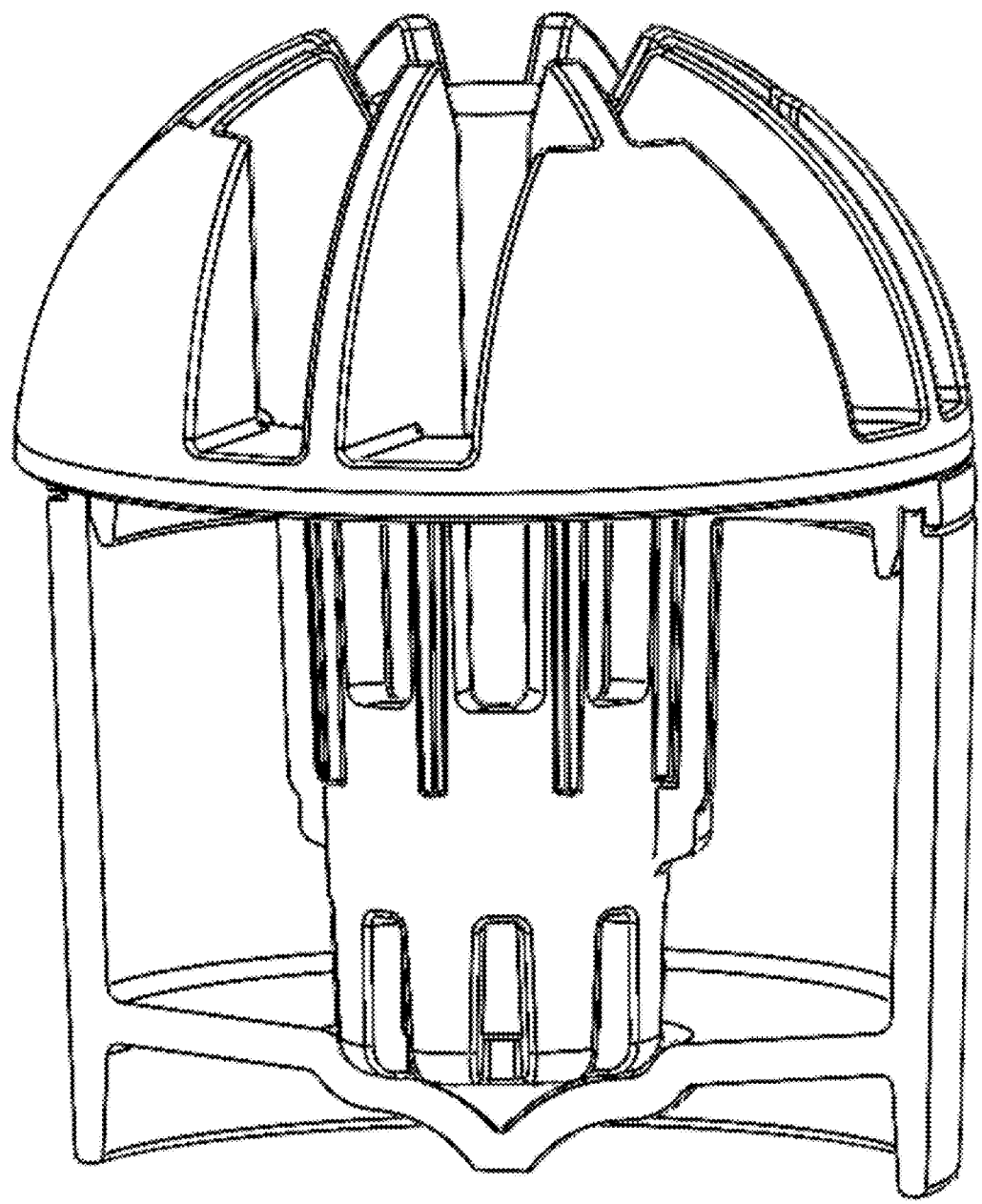
FIG. 23 is a perspective sectional view of system 21000.
Figure 24:
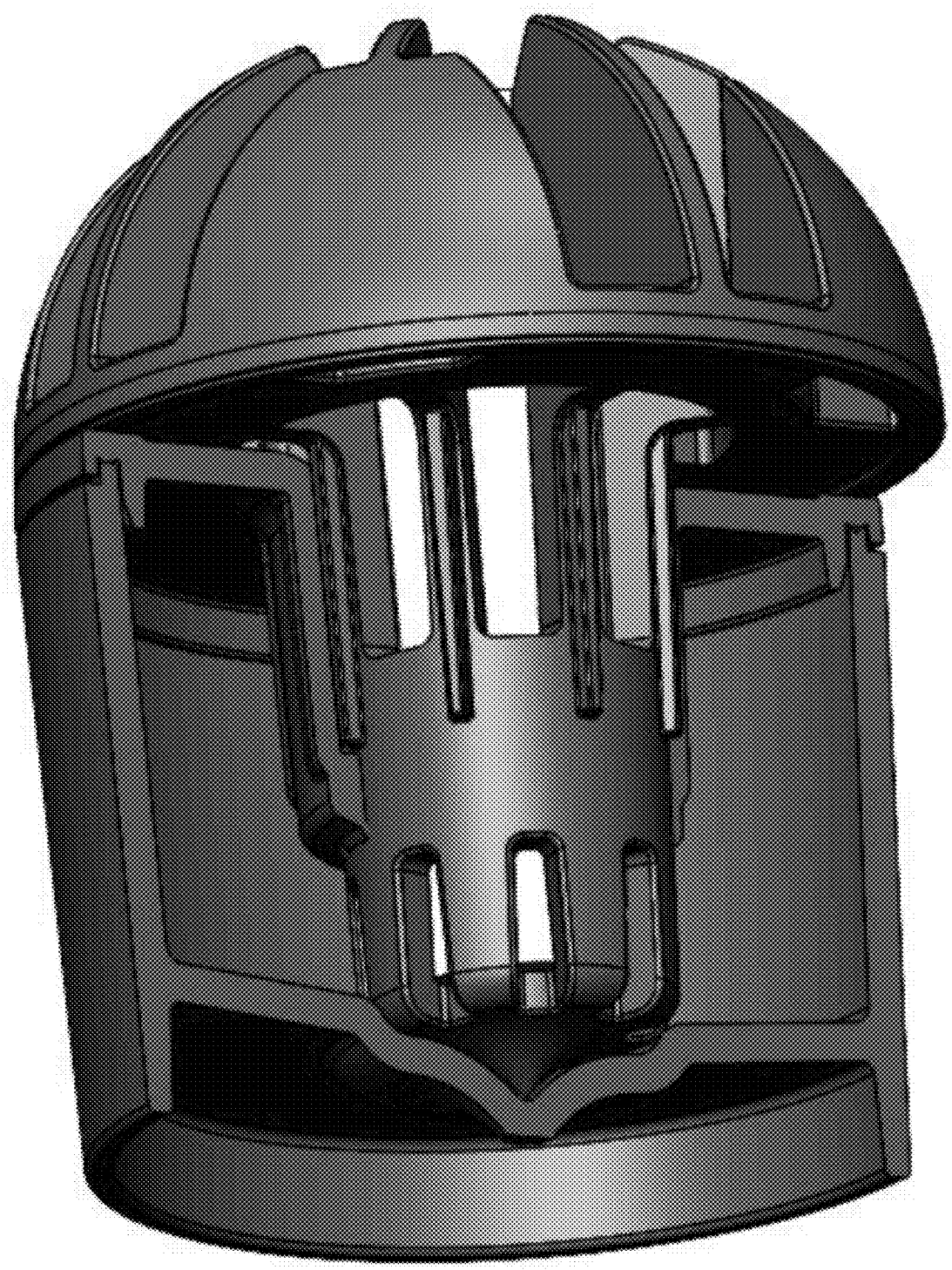
FIG. 24 is a perspective sectional view of system 21000.
Figure 25:
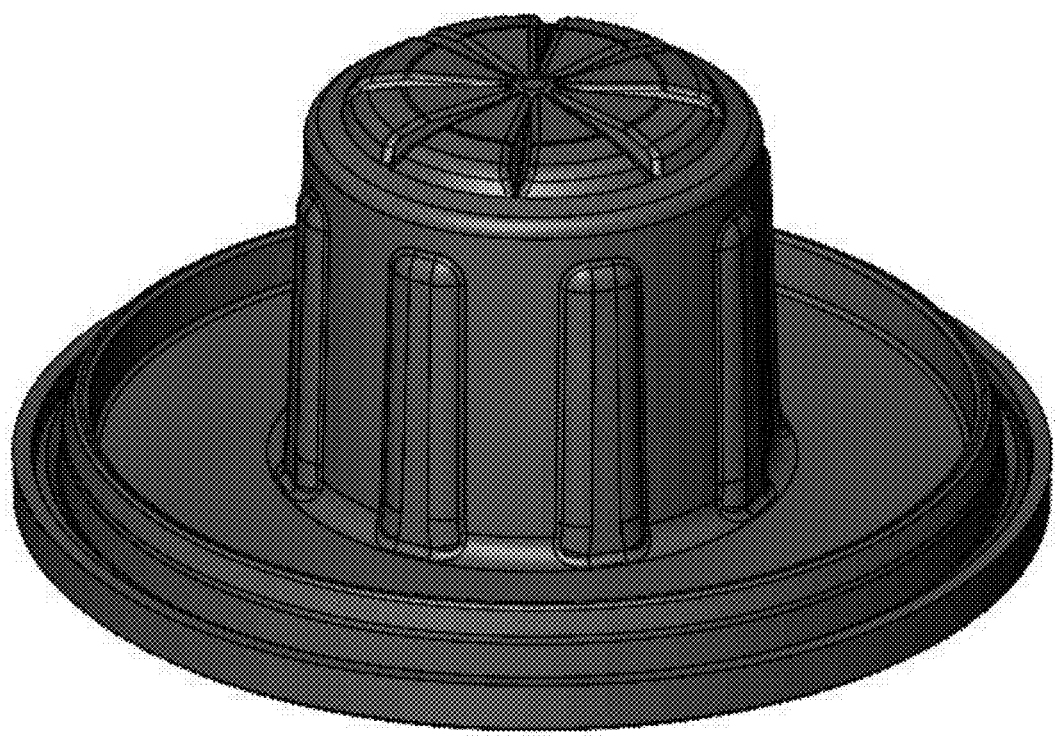
FIG. 25 is a perspective view of an exemplary embodiment of a cover 25000.

FIG. 22 is a perspective sectional view of system 21000.
FIG. 23 is a perspective sectional view of system 21000.
FIG. 24 is a perspective sectional view of system 21000.
FIG. 25 is a perspective view of an exemplary embodiment of a cover 25000.

Figure 26:
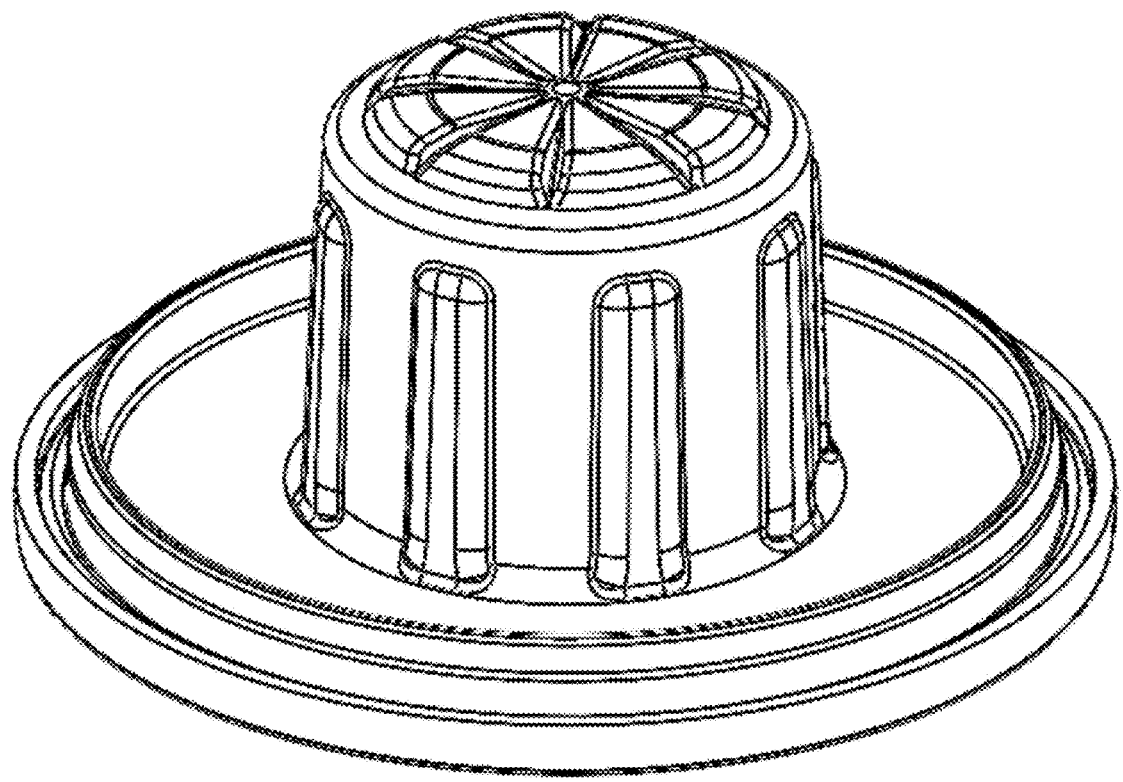
FIG. 26 is a sectional view of an exemplary embodiment of a cover 25000.

FIG. 26 is a sectional view of an exemplary embodiment of a cover 25000.

Figure 27:
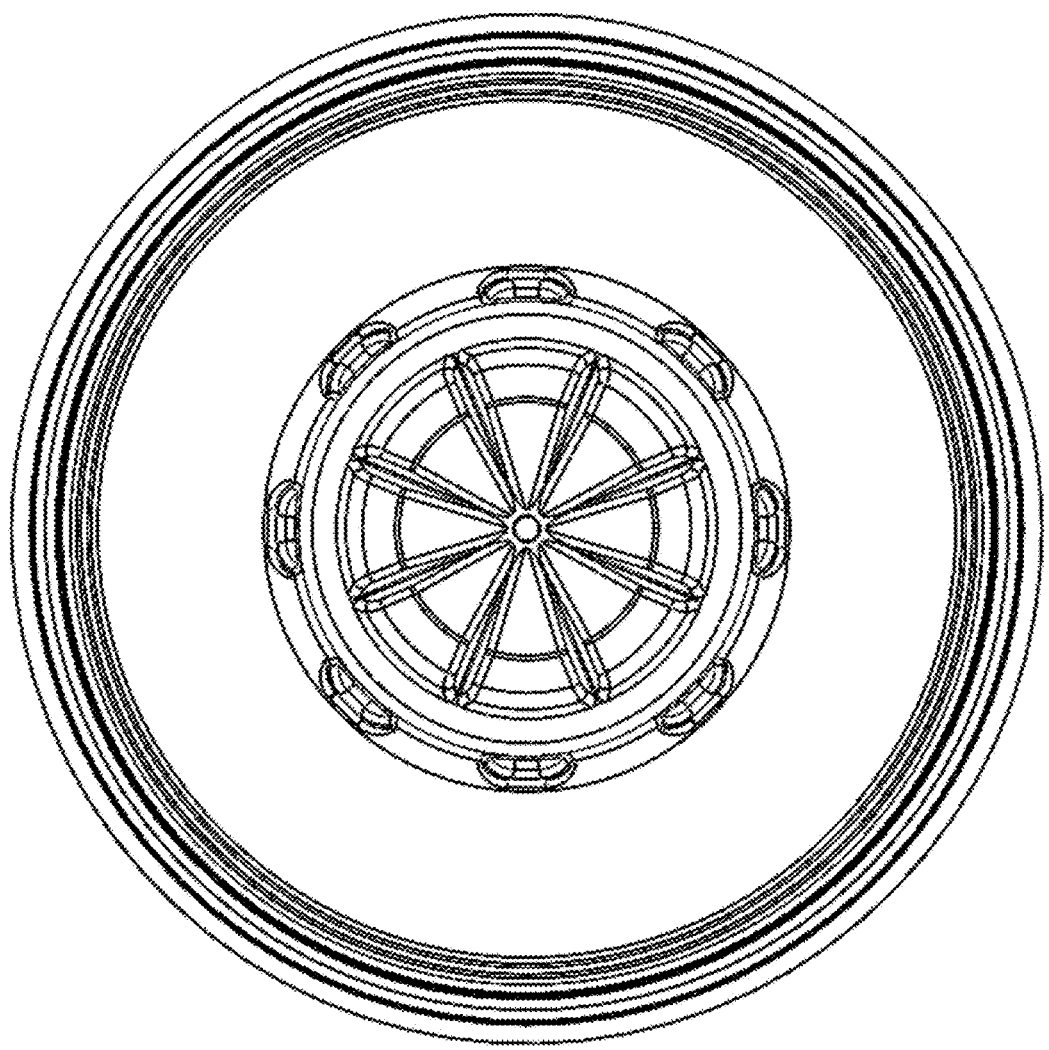
FIG. 27 is a sectional view of an exemplary embodiment of a cover 25000.

FIG. 27 is a sectional view of an exemplary embodiment of a cover 25000.

Figure 28:
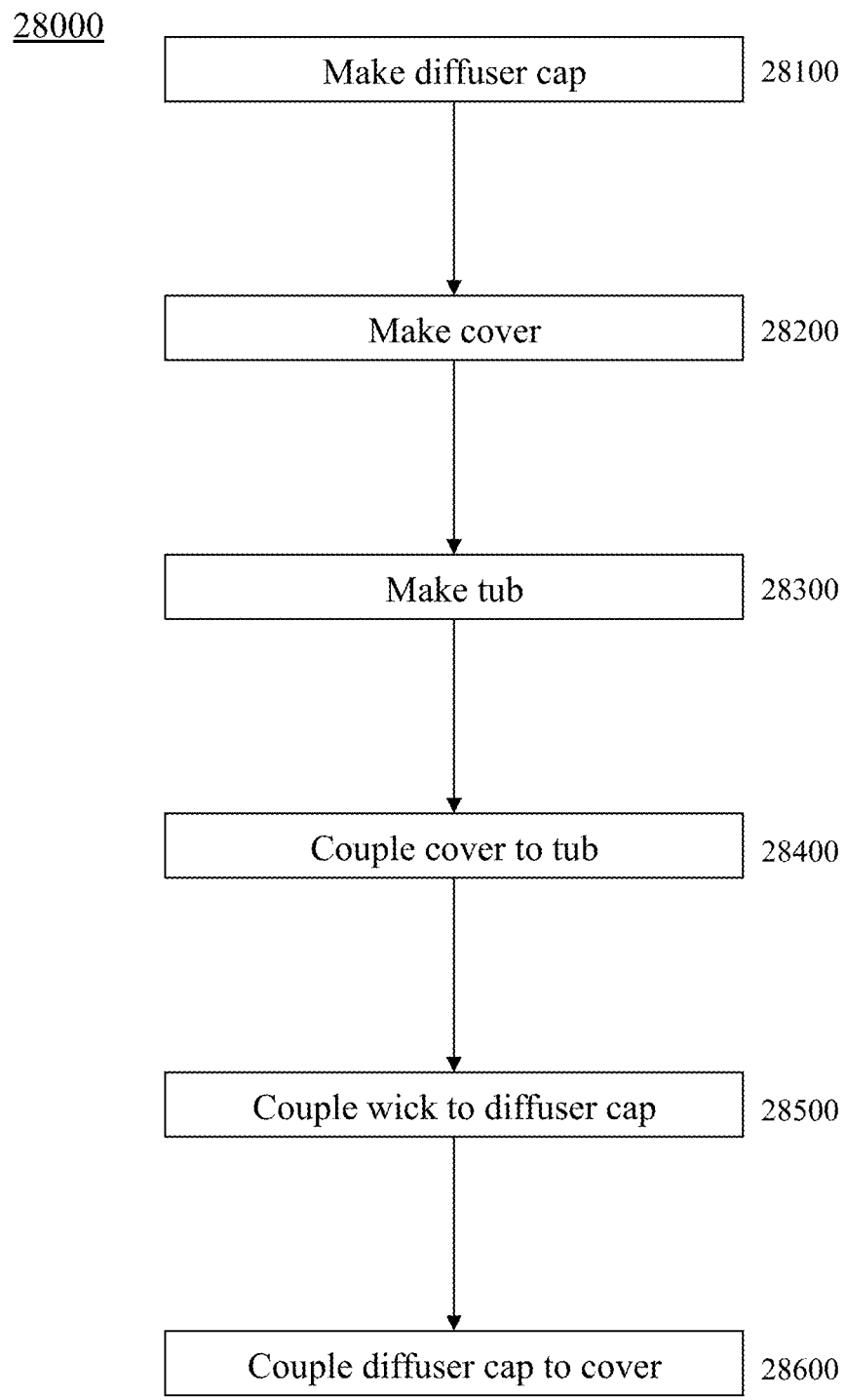
FIG. 28 is a flowchart of an exemplary embodiment of a method 28000.

FIG. 28 is a flowchart of an exemplary embodiment of a method 28000. At activity 28100, a diffuser cap is made. In certain exemplary embodiments, the diffuser cap can be molded. The diffuser cap comprises a central stem. The central stem is constructed to house or hold a wick. The diffuser cap is constructed to vent vapor conveyed to the diffuser cap via the wick. The diffuser cap can define a plurality of vent-like slits that extending from a top of the diffuser cap in a crosshair design.

At activity 28200, a cover is made. The cover is coupleable to the diffuser cap. T cover defines an annular cross-section, the annular cross-section constructed to partially enclose the wick.

At activity 28300, a tub is made. The tub defines a cavity. The tub is constructed to hold a liquid in the cavity. The tub comprises a top ring. The tub can have a concave bottom such that substantially all liquid in the tub can flow to the wick as the tub empties.

At activity 28400, the cover is coupled to the top ring of the tub.

At activity 28500, the wick is coupled to the diffuser cap.

At activity 28600, the diffuser cap is coupled to the cover. In certain exemplary embodiments, the diffuser cap comprises two pins that couple the diffuser cap to the cover.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof adapted to—made suitable or fit for a specific use or situation.

adapter—a device used to effect operative compatibility between different parts of one or more pieces of an apparatus or system.

all—substantially everything.

and/or—either in conjunction with or in alternative to.

aperture—an opening in something.

apparatus—an appliance or device for a particular purpose.

associate—to join, connect together, and/or relate.

bottom—a lowermost portion of something when oriented in an operating position.

broken—damaged or altered by breaking.

can—is capable of, in at least some embodiments.

cap—an overlaying structure.

cause—to produce an effect.

cavity—a hollow space in an object.

central—a portion of something that is between two other portions.

circular—having a shape of a closed plane curve, every point of which is substantially equidistant from a fixed point within the curve.

comprising—including but not limited to.

concave—a hollowed or rounded inward like the inside of a bowl.

configure—to make suitable or fit for a specific use or situation.

connect—to join or fasten together.

constructed to—made to and/or designed to.

convey—to transport from one location to another.

couple—to link in some fashion.

coupleable—capable of being joined, connected, and/or linked together.

cover—(n) a thing that lies on or over an aperture in order to control ingress and/or egress via the aperture; (v) to place a thing on or over an aperture in order to control ingress and/or egress via the aperture.

create—to bring into being.

crosshair design—having an appearance of two lines that intersect in the shape of a cross.

cross-section—a section formed by a plane cutting through an object, such as at right angles to an axis.

cylindrical—having a shape of a surface or solid bounded by two parallel planes and generated by a straight line moving parallel to the given planes and tracing a curve bounded by the planes and lying in a plane perpendicular or oblique to the given planes.

define—to establish the outline, form, or structure of determine—to obtain, calculate, decide, deduce, and/or ascertain.

device—a machine, manufacture, and/or collection thereof.

diffusion—a net movement of something generally from a region of higher concentration to a region of lower concentration.

empty—to remove material until substantially all material has been removed.

enclose—to substantially surround and/or embody something.

engage—to be in contact and interact with.

essential oil—a concentrated hydrophobic liquid containing volatile chemical compounds from plants.

extend—to continue in a specified direction.

flow—a movement of a substance from one location to another.

generate—to create, produce, give rise to, and/or bring into existence.

hold—to contain something.

house—to enclose, cover, protect, and/or support something.

initialize—to prepare something for use and/or some future event.

install—to connect or set in position and prepare for use.

liquid—a fluid that has no independent shape but has a definite volume and does not expand indefinitely and that is only slightly compressible.

make—to lay out and construct.

may—is allowed and/or permitted to, in at least some embodiments.

method—a process, procedure, and/or collection of related activities for accomplishing something.

mold—(n) a cavity into which a substance is poured and cured; (v) to form via pouring and curing a substance in a cavity.

partially—to a limited extent.

pentagonal—having five sides and five angles.

plurality—the state of being plural and/or more than one.

predetermined—established in advance.

provide—to furnish, supply, give, and/or make available.

receive—to get, take, acquire, and/or obtain.

rectangular—a geometric shape defined by a plurality of substantially right angles.

refill—to replace a removed liquid in a cavity.

releasably—coupled so as to be substantially nondestructibly removable.

repeatedly—again and again; repetitively.

resist—to be substantially unaltered from something and/or unharmed by something.

ring—an annular shaped portion of an object.

seal—something that prevents fluid transfer until broken.

select—to make a choice or selection from alternatives.

set—a related plurality.

slide—to move along a surface.

slit—an elongated opening.

stem—a projecting part that extends from a surface.

store—to place, hold, and/or retain.

substantially—to a great extent or degree.

support—to bear the weight of, especially from below.

system—a collection of mechanisms, devices, machines, articles of manufacture, processes, data, and/or instructions, the collection designed to perform one or more specific functions.

top—an uppermost portion of something when oriented in an operating position.

transmit—to send, provide, furnish, and/or supply.

tub—a container in which a liquid is stored.

vapor—a substance diffused or suspended in a gas (e.g., suspended in air).

vent—a device that channels pressurized air.

via—by way of and/or utilizing.

wick—an object that comprises a material that draws up liquid.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- no characteristic, function, activity, or element is "essential";
- any elements can be integrated, segregated, and/or duplicated;
- any activity can be repeated, any activity can be performed by multiple entities, and/or any activity can be performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a tub, the tub defining a cavity, the tub constructed to hold a liquid in the cavity, the tub comprising a top ring;
   a cover, the cover having a generally cylindrical body with an outer rim at a first end thereof, a breakaway membrane at a second end thereof and multiple slots on an interior perimeter thereof, the cover further defining a first aperture, the cover constructed to be coupled to the top ring of the tub at a first end thereof, wherein the outer rim is fitted to the top ring of the tub and the generally cylindrical body, including the breakaway membrane, of the cover is fitted into the tub to further define the cavity;
   a diffuser cap, the diffuser cap comprising a central stem having a pointed end at a first end thereof, the diffuser cap defining a second aperture at a second end thereof, wherein the central stem of the diffuser cap is constructed to slidably engage with the first aperture of the cover;
   a wick, the wick constructed to convey the liquid via diffusion, the wick constructed to slidably engage with the second aperture of the diffuser cap;
   wherein:
   the central stem is constructed to engage with the wick and further wherein, when the diffuser cap is engaged with the first aperture of the cover, the pointed end of the central stem punctures the breakaway membrane thereby introducing the liquid from the cavity to the wick; and
   the diffuser cap constructed to vent vapor conveyed to the diffuser cap via the wick.

2. The system of claim 1, wherein: the tub has a concave bottom such that substantially all of the liquid in the tub flows to the wick as the tub empties.

3. The system of claim 1, wherein: the tub has a substantially circular cross-section.

4. The system of claim 1, wherein: the tub has a substantially rectangular cross-section.

5. The system of claim 1, wherein: the diffuser cap is releasably coupleable to the cover.

6. The system of claim 1, wherein the cover, including the breakaway membrane, are formed of plastic.

7. The system of claim 6, wherein a thickness of the plastic breakaway membrane is less than a thickness of the plastic cylindrical body of the cover.

8. The system of claim 7, wherein the plastic breakaway membrane includes multiple cuts therein, wherein the cuts are made to a depth that is less than the thickness of the plastic breakaway membrane.

9. The system of claim 1, wherein the central stem of the diffuser cap includes multiple vents therein, wherein when the diffuser cap is engaged with the first aperture of the cover, the liquid from the cavity passes through the multiple vents to the wick.

10. The system of claim 1, wherein the central stem of the diffuser cap includes multiple ribs on an exterior thereof for engaging with the multiple slots of the cylindrical body of the cover.

* * * * *